US008025249B2

(12) United States Patent
Alliss et al.

(10) Patent No.: US 8,025,249 B2
(45) Date of Patent: Sep. 27, 2011

(54) BI-DIRECTIONAL TRIMMER HEAD SPOOL WITH CURVED TRIMMER LINE GUIDE

(76) Inventors: George E. Alliss, Bladenboro, NC (US); Steven W. Hamblin, Daleville, VA (US)

( * ) Notice: Subject to any disclaimer, the term of this patent is extended or adjusted under 35 U.S.C. 154(b) by 604 days.

(21) Appl. No.: 11/985,673

(22) Filed: Nov. 16, 2007

(65) Prior Publication Data
US 2008/0120847 A1 May 29, 2008

Related U.S. Application Data

(60) Provisional application No. 60/859,246, filed on Nov. 16, 2006.

(51) Int. Cl.
*B26B 7/00* (2006.01)
(52) U.S. Cl. ........................ 242/388.1; 30/276
(58) Field of Classification Search .............. 30/276, 30/347, DIG. 5; 56/12.5, 12.7, 255, 294, 56/295; 172/13; 242/378, 378.1, 388, 388.1, 242/476.1, 587, 587.2, 587.3
See application file for complete search history.

(56) References Cited

U.S. PATENT DOCUMENTS

| | | | | |
|---|---|---|---|---|
| 1,253,415 A | * | 1/1918 | Nebitt | 242/378.3 |
| 2,429,675 A | * | 10/1947 | Eypper | 242/388.1 |
| 4,062,114 A | | 12/1977 | Luick | |
| 4,104,797 A | | 8/1978 | Ballas | |
| 4,163,530 A | * | 8/1979 | Kondo et al. | 242/378.1 |
| 4,274,201 A | | 6/1981 | Oberg et al. | |
| 4,310,970 A | | 1/1982 | Evenson et al. | |
| 4,411,069 A | | 10/1983 | Close et al. | |
| 4,490,910 A | | 1/1985 | Mattson et al. | |
| 4,672,798 A | | 6/1987 | Ota | |
| 4,702,005 A | | 10/1987 | Pittinger, Sr. et al. | |
| 4,893,410 A | | 1/1990 | Hoffmann et al. | |
| 5,193,278 A | | 3/1993 | Osakabe et al. | |
| 5,293,692 A | | 3/1994 | Sugihara et al. | |
| 5,526,572 A | | 6/1996 | Sugihara et al. | |
| 5,588,626 A | * | 12/1996 | Yang | 242/378.1 |
| 5,758,424 A | | 6/1998 | Iacona et al. | |
| 5,765,287 A | * | 6/1998 | Griffini et al. | 30/276 |
| 5,887,348 A | | 3/1999 | Iacona et al. | |
| 5,896,666 A | | 4/1999 | Iacona et al. | |
| 6,148,523 A | * | 11/2000 | Everts et al. | 30/276 |
| 6,263,580 B1 | * | 7/2001 | Stark et al. | 30/276 |
| 6,347,455 B2 | | 2/2002 | Brant et al. | |
| 6,418,627 B1 | | 7/2002 | Tsunoda et al. | |
| 6,519,857 B1 | | 2/2003 | Proulx et al. | |
| 6,581,292 B2 | | 6/2003 | Alliss | |
| 6,854,185 B1 | * | 2/2005 | Alliss | 30/276 |

(Continued)

FOREIGN PATENT DOCUMENTS
WO WO 03/015497 2/2003
(Continued)

*Primary Examiner* — Edward Landrum
(74) *Attorney, Agent, or Firm* — LaMorte & Associates, P.C.

(57) ABSTRACT

In an embodiment, a spool for a trimmer head has a structure for guiding the trimmer line around a region for a driveshaft. In an embodiment, a component (e.g., a turn knob or a stop) is attached to the spool so that after determining the orientation in which to install the spool, the user is unlikely to install the spool in another orientation, even though the spool is invertible. In an embodiment, the turn knob also includes a structure that allows the turn knob to be used as a tool (e.g., as a wrench or screw driver) that facilitates disassembling the trimmer head.

12 Claims, 17 Drawing Sheets

U.S. PATENT DOCUMENTS

| | | |
|---|---|---|
| 6,928,741 B2 | 8/2005 | Proulx et al. |
| 6,944,956 B1 | 9/2005 | Fogle |
| 6,952,877 B2 * | 10/2005 | Pfaltzgraff ............... 30/276 |
| 6,983,543 B2 * | 1/2006 | Fogle ............... 30/347 |
| 7,111,403 B2 | 9/2006 | Moore |
| 2002/0189107 A1 | 12/2002 | Arnetoli |
| 2004/0094649 A1* | 5/2004 | Park ............... 242/378.1 |
| 2004/0148784 A1 | 8/2004 | Grace |
| 2005/0229402 A1 | 10/2005 | Iacona |
| 2005/0252009 A1 | 11/2005 | Alliss |
| 2006/0026846 A1 | 2/2006 | Alliss |
| 2007/0084061 A1 | 4/2007 | Bennett |
| 2007/0130781 A1 | 6/2007 | Iacona |
| 2008/0053052 A1 | 3/2008 | Cigarini |
| 2008/0083120 A1 | 4/2008 | Alliss |

FOREIGN PATENT DOCUMENTS

| | | |
|---|---|---|
| WO | WO 2005/022975 | 3/2005 |
| WO | WO 2005/110685 | 11/2005 |
| WO | PCT/US2008/005665 | 5/2008 |
| WO | PCT/US2008/007204 | 6/2008 |

* cited by examiner

BI-DIRECTIONAL TRIMMER HEAD SPOOL WITH CURVED TRIMMER LINE GUIDE

CROSS REFERENCE TO RELATED APPLICATIONS

This application claims priority benefit of U.S. Provisional Patent Application 60/859,246, filed Nov. 16, 2006 by George E. Alliss, which is incorporated herein by reference. This application is related to US Patent Application Publication US 2005/0252009 A1, which is patent application Ser. No. 11/126,842, filed Nov. 17, 2005 by George E. Alliss, which is incorporated herein by reference.

FIELD

The invention relates generally to vegetation trimmer apparatuses.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. Unless otherwise identified as prior art, the subject matter in the background section merely represents different approaches, which in and of themselves may also be inventions.

Internal combustion engine and electric motor powered vegetation trimmers are commonly used to cut and trim grass, weeds, brush and other vegetation. The typical motorized trimmer may include an elongated handle to which is connected an internal combustion or electric motor that rotatably drives a trimmer head located at a distal end of the handle. This machine is "handheld".

The trimmer head (e.g., a rotary cutting head attachment to a driveshaft of a trimmer), in turn, carries radially outwardly projecting cutting implements, which cut the vegetation as the trimmer head rotates. In addition to "handheld" vegetation cutting machines there are also wheeled type vegetation trimmers, which are gas powered, and utilize an engine that generates much greater horsepower than any "handheld" type machine, the trimmer and cutting machines are designed to cut very dense (e.g., thick) vegetation and brush. These trimmer machines use some types of cutting heads that are used with the "handheld" trimmer machines.

The trimmer head may include one or more flexible monofilament line or rigid cutting implements. Rigid cutting implements (a cutting means) typically assumes the form of blades fabricated from plastic and or metal and often have corrugations or scalloping about their peripheral cutting edges. They are a unitary one-piece cutting blade molded from a durable high strength plastic/metal material with plurality of cutting arms extending outward from the hub. The pivoting type rigid blades are attached to circular pins mounted vertically on the peripheral portion of trimmer head body, and the body is attached directly to the trimmer machine's driveshaft. The pivoting blades yield when they contact hard objects, thereby prolonging the service life of these blades. Other fixed rigid type blades mount directly to the trimmer driveshaft. Both of these above mentioned vegetation cutting blades are normally used to cut very dense and thick grasses, and weeds to include brush. Other forms of rigid type of cutting blades are used on handheld and wheeled type trimmer machines alike. A usage of rigid cutting blades is for cutting, weeds, small bushes, corn stalks, brush, saplings having a small diameter, 3" thick, for example. Rigid blades may be made from a metal disc (e.g., a circular plate) that is attached to the driveshaft of the trimmer machine and mounted around the periphery of the metal disc is a series of chainsaw cutting teeth as used on a "Chainsaw." All of the above mentioned types of blades may cause considerable injury to the trimmer operator or other persons during operation of the trimmer, should the operator or other persons be accidentally struck by one of these types of blades, if they are made of metal or hard, rigid, sharp plastic material.

Generally, weeds growing on footpaths between rice fields etc. have to be cut several times a year because they tend to be nested by pests. The weed cutting is usually very laborious, and thus various automatic weed cutters have heretofore been proposed and put to practical use, among which shoulder-hung weed cutters are very popular because of their small size and handling ease. In most of the shoulder-hung weed cutters, a driving-force transmission shaft or driveshaft, which is passed through a pipe-shaped handling rod, is rotated via an engine provided at one end of the handling rod so as to rotate a cutter blade provided at the other end of the handling rod.

In most cases, a human operator hangs the weed cutter on his or her shoulder using a hanging belt, and cuts weeds with the rotating cutter blade by gripping a U-shaped handle provided on an intermediate position of the handling rod to swing the handling rod in front-and-rear and left-and-right directions.

Both in light duty, medium and heavy duty gas and electric powered trimmers, the cutting implements may be fabricated as a continuous strand flexible monofilament plastic line wrapped about a spool contained within the trimmer head. In such devices, the plastic line is typically selectively dispensed by the centrifugal force generated by rotation of the trimmer head.

A disadvantage common to these sorts of devices is that the line quite frequently becomes jammed when a user attempts to dispense fresh line from the spool and the line prematurely breaks off at the eyelet because the diameter of the line is small and has little tensile strength when making contact with hard objects and heavy vegetation. When this occurs, the user generally must stop the trimming operation, disassemble the trimmer head, fix the jam and or extend line through the eyelets and reassemble the trimmer head before resuming trimming. Such repeated disruption is very frustrating and time-consuming by the end user. It should be noted that spool heads of automatic and semi-automatic type, include a line cutting blade on the debris shield. When the head is bumped on the ground and dispenses the line, more line is generally extended from the storage spool than needed, and the blade on the shield cuts off the extra line.

Another species of vegetation trimmer cutting apparatuses are automatic spool trimmer heads. This type of trimmer cutting head is called "automatic trimmer head." The automatic trimmer heads require no tapping on the ground and automatic trimmer heads always feed out a set length of trimmer line.

Another species of vegetation trimmer, where trimmer line is selectively dispensed from a spool by an operator, is fully manual in operation. Devices of this sort include at least one or more, typically spring-biased, indexing pins or buttons that are connected to one or more internal trimmer line carrying spools. In order to dispense trimmer line, an operator displaces the indexing pins or buttons from a seating engagement with one or more holes provided in the trimmer head housing.

Once the indexing pin(s) or button(s) are separated from the housing, the user either turns the internal spool(s) or pulls on the trimmer line itself from the spool in order to pay out the line from the trimmer head. When the desired length(s) of trimmer line have been dispensed, the operator reseats the indexing pin(s) or button(s) into their associated indexing opening(s) in the trimmer head housing.

Another species of spool trimmer heads has surfaced, which is very distinctly and substantially different from prior art examples of spool trimmer heads described and reference above. Typically, reloading fresh line into a spool trimmer head is a difficult and time consuming process. All the prior art reference spool trimmer heads reference above, require some form of disassembly of the trimmer head components prior to loading or reloading new trimmer line onto the spool.

Spool type trimmer heads often have some form of anchoring means to secure one or more fixed lengths of line to the hub of the spool prior to wrapping the lengths of line onto and around the spool hub.

Another species of vegetation trimmer heads employs finite or fixed cut lengths of monofilament (nylon) plastic line or string that can be quickly and easily replaced as they become broken or worn, without need to resort to disassembly and reassembly of the trimmer head.

In this category of trimmer heads the finite length(s) of trimmer line are securely held in a fixed position within the trimmer head body by different methods (i.e., weaving means, different types and forms of clamping means with and without mechanical bias, special injection molded flails that have a special end portion of the cutting flail that holds the finite length of cutting line securely in the body of the trimmer head during cutting operations, etc.). All of the these fixed length types of line vegetation trimmer cutting heads provide the end user a more user friendly trimmer head product vs. the standard spool "bump and feed" product.

Fixed length trimmer heads have the benefit of making the replacement of worn flexible cutting line and the loading of new flexible cutting line much easier. These types of trimmer heads allow the end user the opportunity the ability to use a broad range of flexible lines having many diameters (e.g., diameters including 0.065" to 0.155"). These trimmer heads typically weigh less and are less expensive to manufacture. Since fixed length type vegetation cutting heads can receive and hold a wide range of differently sized trimmer lines, a customer can select the size of line that works best with the size and power of the machine available. Too large of a flexible cutting line diameter and too long of a length extending from the exit ports of the head will deplete the rotational speed and power because of air drag caused by the size of the cutting line. There is a wide variety of electric and gas powered trimmer machines manufactured and they also have a wide range of power ratings per machine. It is important to select and use the right cutting attachment with different machines so that they will work efficiently and safely during operation.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION OF THE INVENTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-19 is a brief description of each element, which may have no more than the name of each of the elements in the one of FIGS. 1-19 that is being discussed. After the brief description of each element, each element is further discussed in numerical order. After discussing the elements of FIGS. 1-19 in numerical order, a further discussion of FIGS. 1-19 follows. In general (except for the further discussion of FIGS. 1-19), each of FIGS. 1-22 is discussed in numerical order and the elements within FIGS. 1-22 are also usually discussed in numerical order to facilitate easily locating the discussion of a particular element. Nonetheless, there is no one location where all of the information of any element of FIGS. 1-22 is necessarily located. Unique information about any particular element or any other aspect of any of FIGS. 1-22 may be found in, or implied by, any part of the specification.

Vegetation Trimmer

Figure 1:
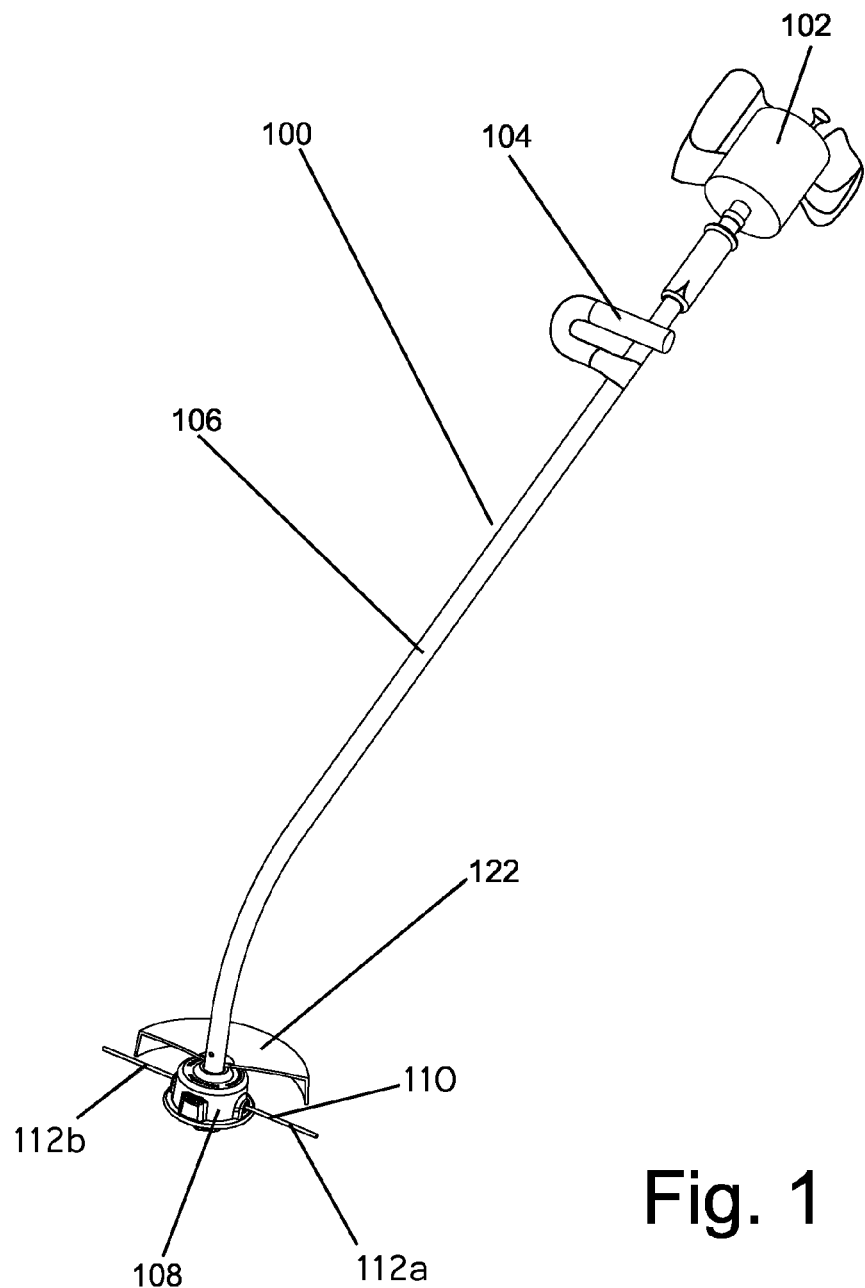
FIG. 1 is an illustration of an example of a vegetation trimmer according to the present invention.

FIG. 1 is an illustration of an example of a vegetation trimmer 100 according to the present invention. Vegetation trimmer 100 may include motor 102, steering handle 104, shaft 106, trimmer head 108, trimmer line 110 having ends 112a and b, and optional shield 122. In other embodiments, vegetation trimmer 100 may not have all of the elements listed and/or may have other elements instead of or in addition to those listed.

Vegetation trimmer 100 may be a handheld device that is used for cutting vegetation or other material. Motor 102 powers vegetation trimmer 100. Motor 102 may be an electric motor, combustion engine, or another type of motor. Steering handle 104 may be used for holding, guiding, and directing the vegetation trimmer. Shaft 106 may also be used for holding vegetation trimmer 100. Shaft 106 may be hollow and, within the hollow portion, shaft 106 may contain a mechanical connection (which maybe referred to as the driveshaft) coupling motor 102 to a trimmer head. The present invention avoids the above referenced problems experienced in the prior art. This is a "bi-directional", spool trimmer head invention that does not require disassembly of the trimmer head components prior to reloading new trimmer line onto the enclosed storage spool. This specification may have some similarity to current US, Non-Provisional Patent Application US2005/0252009, Nov. 17, 2005. There are multiple manufactures of handheld weed trimmer machines and models that are offered and sold on the market. There is "no" common or standard specification (i.e., design, type or size) in the industry for driveshaft arbors for the attachment of a string trimmer head or other types of vegetation cutting tools to a handheld trimmer machine (e.g., gas and/or electric trimmer machines).

The majority of manufacturers use a threaded fastener (e.g., a male and/or female nut and bolt) to secure the main housing of the trimmer head to the threaded driveshaft arbor. There are driveshaft arbors for attaching a string trimmer head that are relatively "short" in length, and there are "longer" driveshaft arbors that extend through the top center opening of the trimmer head main housing and through the center of the spool and beyond. In an embodiment, trimmer head 108 uses one of the "longer" driveshaft arbors. Examples of prior art having easy load, spool trimmer heads with "longer" type driveshaft arbors are: U.S. Pat. Nos. 5,659, 960; 5,671,536; 5,806,192; 6,148,523 by Everets, U.S. Pat. No. 6,263,580 by Stark; and US Patent Application 20050217120 by Proulx, which may include an easy load, spool trimmer head with separate fixed lengths of line for reloading the inner spool.

Trimmer head 108 may connect, via the driveshaft, to shaft 106 at a distal end. Trimmer head 108 may be used with other types of trimmers other than vegetation trimmer 100. For example, although vegetation trimmer 100 is illustrated as a handheld machine, an embodiment of a trimmer head 108 may be used on a wheeled trimmer machine. As used herein, the terms "top" and "bottom" refer to the relative positions that the top and bottom of trimmer head 108 would assume when trimmer head 108 is "in use" or while "operating," when attached to shaft 106 of vegetation trimmer 100.

Trimmer head 108 may hold trimmer lines 110, and may include a spinning portion that causes ends 112a and b to rotate at a fast enough speed to cut vegetation. Trimmer lines 110 may be a flexible wire. For example, trimmer lines 110 may be a nylon wire or other type of wire. As trimmer head 108 spins ends 112a and b tend to extend radially outward as a result of the centrifugal force. In an embodiment, trimmer lines 110, may be any of a wide range of both different sizes (e.g., 0.047" to 0.160" in diameter) and of different shapes, such as round or non-round cross sections (e.g., square, octagon, hexagon, diamond, or oval). For example, trimmer line 110 may be any trimmer line constructed as a flexible yet rugged filament, string, or wire. In an embodiment, trimmers line 110 may be any of the commercially available flexible monofilament plastic trimmer lines of any suitable type and cross-sectional configuration, such as 0.065", 0.080", 0.095", 0.105", 0.12", 0.130" or 0.155" gauge nylon trimmer line or the like, which is currently used as cutting filament in a conventional vegetation trimmer.

Shield 122 is optional. Shield 122 is for the operator's safety. Shield 122 may protect the user from flying debris that may be kicked up by ends 112a and b or trimmer head 108.

In an embodiment, trimmer head 108 is a fixed line trimmer head for flexible line trimmers that does not require disassembly, which can be easy and quickly loaded as well as easily and quickly unloaded without the use of a separate tool. In an embodiment, trimmer head 108 is a fixed line trimmer head for flexible line rotary trimmers that simplifies both easy line loading and unloading of trimmer line while providing a tight securement of the line to the head "non-dependent" of the rotational velocity of the head. In an embodiment, a trimmer head 108 is for flexible line rotary trimmers, and includes a simplified easy trimmer line removal, and trimmer head 108 is of simple construction and economical to manufacture. In an embodiment, trimmer head 108 is for flexible trimmer lines and enables easy trimmer line removal and replacement, and is adapted for use in heavy brush. In an embodiment, trimmer head 108 is for a flexible line rotary trimmer that has a simplified easy line removal and replacement while providing a tight securement of the line to the head independent of the rotational velocity of the head and is adaptable for use with cutting line of a wide variety of diameters and round and non-round shapes.

In an embodiment, trimmer head 108 is for a flexible line rotary trimmer that has a simplified line removal and replacement without the need for any disassembly and reassembly of trimmer housing parts while replacing the trimmer line. In an embodiment, trimmer head 108 is for flexible line rotary trimmers, which are more durable than known arrangements, and reduce (e.g., minimizes) wear on the string during operation. In an embodiment, trimmer head 108 is for flexible line rotary trimmers that can be used on the majority of gas and electric manufactured handheld, wheeled, vegetation, and brush cutting machines (e.g., multi-fit) and is for use by both home users or commercial users. In an embodiment, trimmer head 108 is for flexible line rotary trimmers, which enables both easy loading and unloading of trimmer line while providing a tight securement of the trimmer line to trimmer head 108. The tightness of the securement of trimmer head to the trimmer line may be dependent on the rotational velocity of the head. In an embodiment, trimmer head 108 includes a "one way" gripping device that may slide or pivot and may be spring biased.

Cross-Section of Trimmer Head

Figure 2:
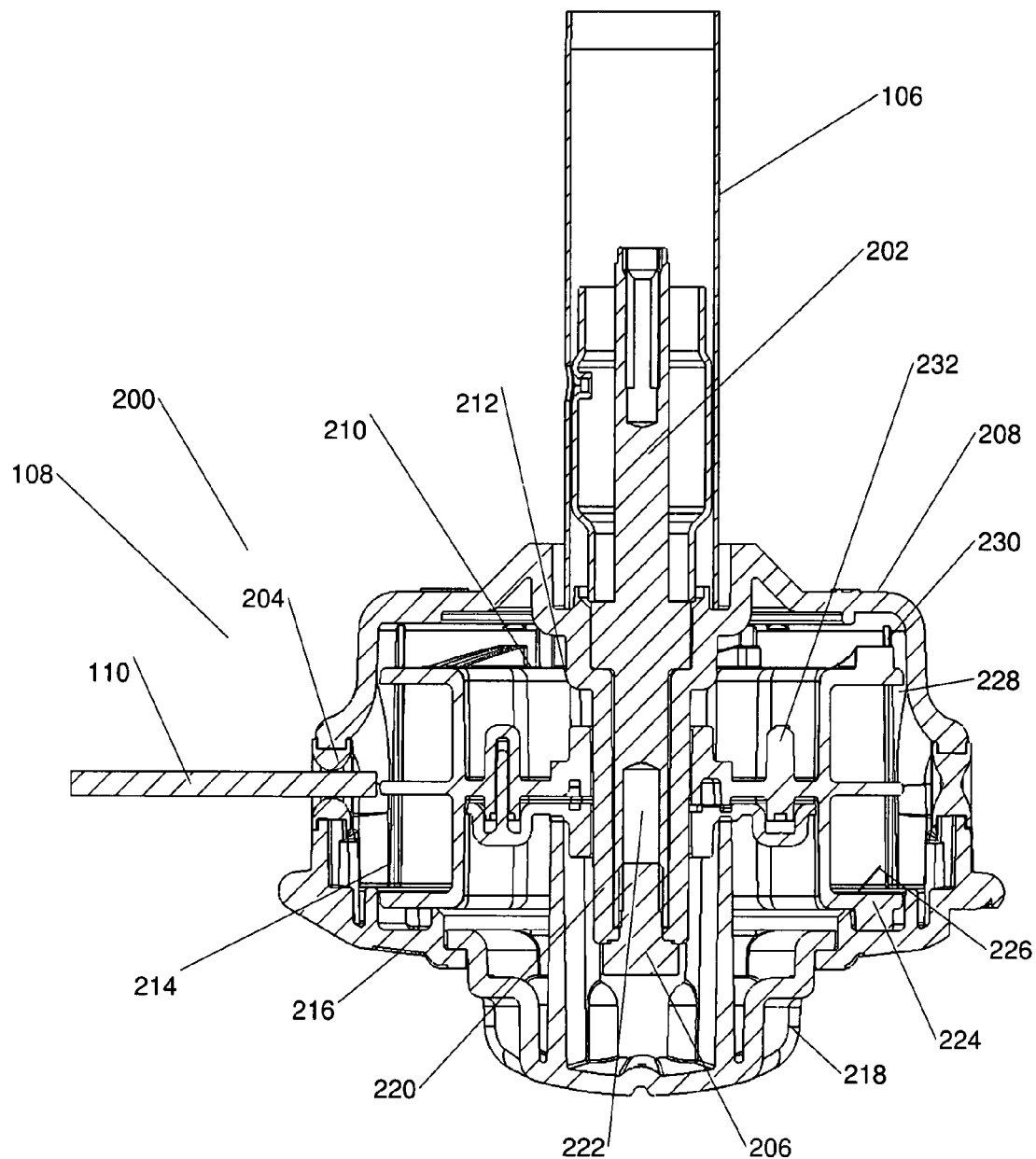
FIG. 2 shows a cross section of an embodiment of a portion of vegetation trimmer having the trimmer head.

FIG. 2 shows a cross section of an embodiment of a portion 200 of vegetation trimmer 100, having trimmer head 108, and trimmer line 110. Trimmer head 108 includes body driveshaft 202, eyelets 204, fastener 206, top housing 208, spool 210, mechanical bias 212, channel 214, bottom housing 216, turning-knob 218, extension 220, opening 222, projection 224, flange 226, flange 228, projection 230 and opening 232. In other embodiments, trimmer head 108 may not have all of the elements listed and/or may have other elements instead of or in addition to those listed.

FIG. 2 shows a cross section view of an embodiment of a trimmer cutting head 108, which may be used for cutting vegetation in conjunction with an internal combustion engine or electric motor powered trimmer apparatus and which may be referred to as a handheld grass and/or weed trimmer or brush cutting machine.

Figure 3:
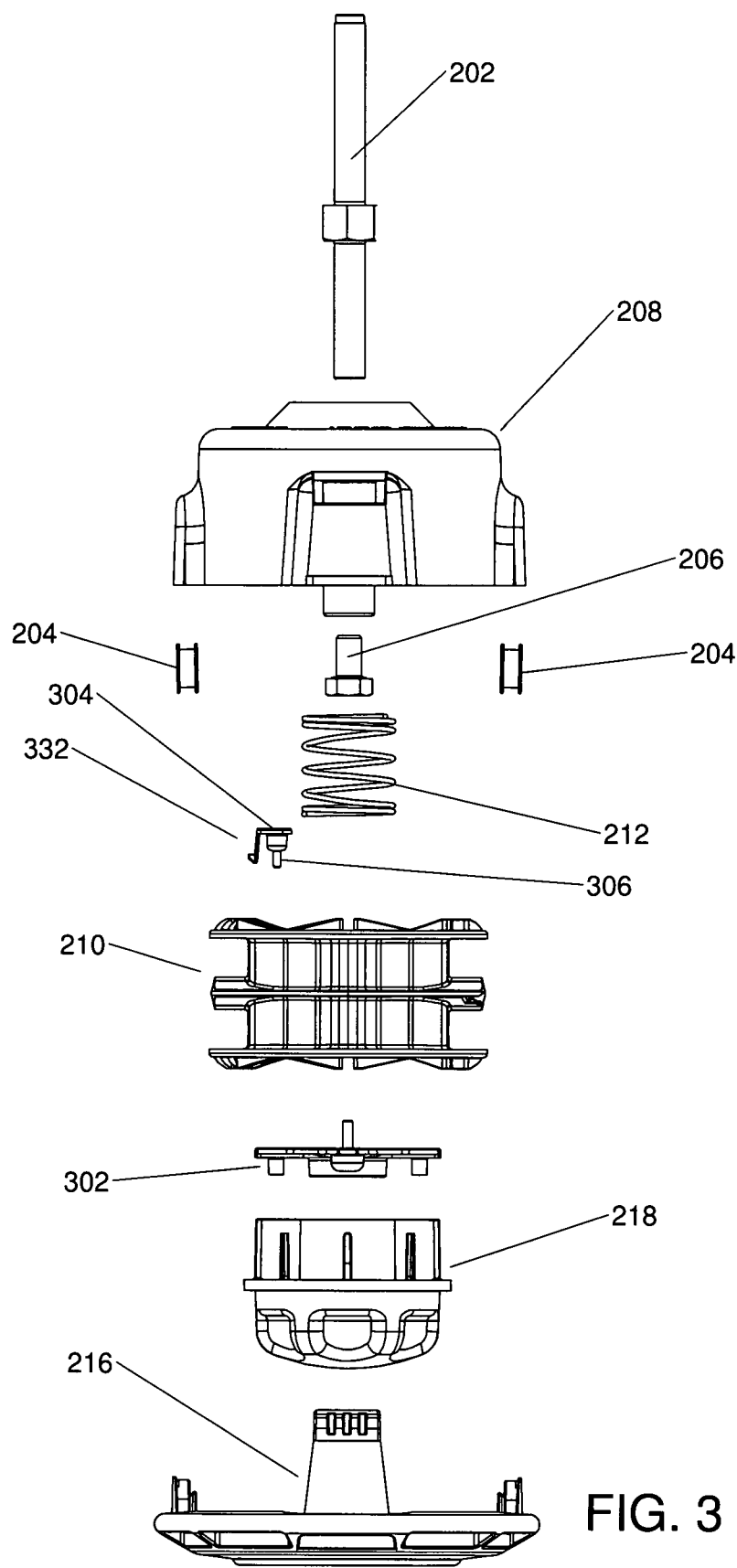
FIG. 3 shows an exploded view of an embodiment trimmer head.
Figure 4:
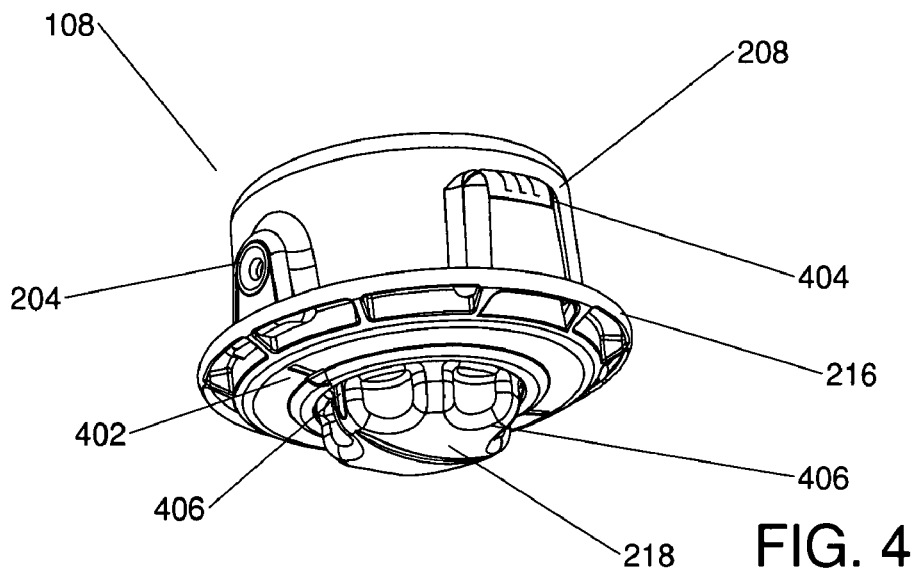
FIG. 4 shows a perspective view of an embodiment of the trimmer head.
Figure 18:
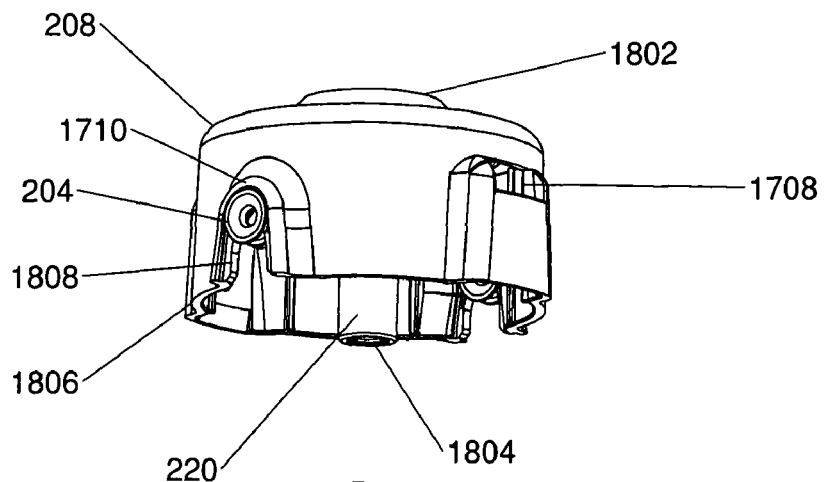
FIG. 18 shows a perspective view of an embodiment of the top portion of the housing.

FIG. 2 is cross section view of the fully assembled trimmer head 108 to a trimmer machine driveshaft which passes vertically through the center of the spool. Portion 200 is a portion of the vegetation trimmer 100 showing enough of shaft 106 to illustrate how trimmer head 108 is fastened to shaft 106. Driveshaft 202 is attached to shaft 106 and is also attached to a portion of trimmer head 108, so that trimmer head 108 spins when driveshaft 202 spins. Eyelets 204 are used for threading a trimmer line 110 into trimmer head 108, and help guide trimmer line 110 into trimmer head 108 (other views of eyelets 204 are shown in FIGS. 3, 4, and 18). Trimmer line 110 passes through eyelets 204 when loading trimmer line 110 into, and discharging trimmer line 110 from, trimmer head 108. Eyelets 204 may be located at diametrically opposed locations on the housing of trimmer head 108. Eyelets 204 are preferably provided with a gently curved contour to reduce breakage of the trimmer line during operation of trimmer head 108.

Fastener 206 is used to attach the main housing body to driveshaft 202. In an embodiment, fastener 206 is a bolt or nut. In an embodiment, fastener 206 is threaded.

Top housing 208 forms an upper portion of the housing. Top housing 208 is attached to shaft 106, via fastener 206. In an embodiment, top housing 208 includes a downward extension. In order to secure top housing 208 to the trimmer machine apparatus, fastener (bolt or nut) 206 is inserted through an opening in the downward extension and attached to driveshaft 202, so that top housing 208 spins with driveshaft 202 and consequently, trimmer head 108 spins with driveshaft 202.

Trimmer head 108 further includes spool 210 for carrying trimmer line 110 that is rotatably supported in the trimmer head housing. Mechanical bias 212 biases spool 210 into a position in which trimmer line 110 is not discharged during operation. During operation, pushing spool 210 in the opposite direction of the bias moves spool 210 into a position in which trimmer line 110 is released. In an embodiment, mechanical bias 212 pushes spool 210 away from top housing 208 (at the top of the trimmer head housing) towards the bottom of the trimmer head housing. In an embodiment, mechanical bias 212 presses spool 210 into engagement with a portion of trimmer head 108 that prevents spool 210 from rotating with respect to trimmer head 108, and thereby prevents trimmer line 110 from being released. In an embodiment, spool 210 includes a core about which trimmer line 110 may be wrapped. In an embodiment, spool 210 has two flanges at opposite ends of the core, which facilitate keeping trimmer line 110 wrapped around spool 210.

Channel 214 is located within spool 210. In an embodiment, channel 214 is located in an intermediate flange, which may be disc shaped and attached to the middle of the core of spool 210. When loading trimmer line 100 into trimmer head 108, channel 214 receives trimmer line 110 after trimmer line 110 has been threaded through one of eyelets 204. Channel 214 aligns with a channel within the core of spool 210. There are two channels 214 on opposite sides of the core of spool 210 each within the intermediate flange. Each of the two channels 214 aligns with the channel in the core and may be aligned with eyelets 204. The combination of channels 214 and the channel in the core forms a pathway that (when spool 210 is properly aligned with eyelets 204) continues from one of eyelets 204 to the other of eyelets 204. The channel within the core of the spool is not visible in FIG. 2, because the channel within the core curves around the central portion of trimmer head 108.

Bottom housing 216 forms a lower portion of the housing. In other words, trimmer head 108 may include a rigid molded plastic first or "top" portion, top housing 208, and a rigid molded plastic second or "bottom" portion, bottom housing 216. Together, top housing 208 and bottom housing 216 (which are body members of the housing) are referred to herein as the housing of trimmer head 108 or as the trimmer head housing. Top housing 208 and bottom housing 216 may be releasably fastened to one another by a snap, threads, a J-slot, or other releasable connection. In an embodiment, eyelets 204 are securely mounted between the circumferential wall of top housing 208 at diametrically opposed locations. In an embodiment, mechanical bias 212 presses spool 210 into engagement with a rib of bottom housing 216, which prevents spool 210 from rotating at a different rate than trimmer head 108 (and thereby prevents trimmer line 110 from being released).

Turning-knob 218 is a knob that turns to load trimmer line 110 onto spool 210. If turning-knob 218 is pushed inwards during operation, trimmer line 110 is released. Pushing turning-knob 218 inwards, releases spool 210 from being in engagement with the ribs 1912 (FIG. 19) of bottom housing 216, thereby allowing spool 210 to rotate with respect to trimmer head 108 (and bottom housing 216).

Extension 220 may be a cylindrical extension that is part of top housing 208, which receives driveshaft 202. Central opening 222 is an opening within top housing 208, via which top housing 208 is attached to driveshaft 202. In an embodiment, extension 220 is a downward extension from top housing 208 that accommodates a driveshaft 202. When driveshaft 202 is connected to bottom housing 216, driveshaft 202 extends through and beyond the center of spool 210. In order to secure top housing 208 to the trimmer machine apparatus, fastener 206 (e.g., a bolt or a nut) may be inserted through central opening 222 of the extension 220 of top housing 208 of the housing. Opening 222 is located within driveshaft 202. Fastener 206 is received within, and engaged by, opening 222 to hold fastener 206 securely in place (thereby attaching the downward extended portion of top housing 208 to driveshaft 202, so that trimmer head 108 spins with shaft 106). In addition to receiving driveshaft 202, extension 220 may maintain mechanical bias 212 in stable orientation during operation of trimmer head 108.

Projection 224 is attached to one end of spool 210, such as to a flange at the end of spool 210. Projection 224 engages bottom housing 216 when pushed into engagement by mechanical bias 212. When engaging bottom housing 216, projection 226 prevents spool 210 from rotating with respect to bottom housing 216. In an embodiment, projection 224 engages ribs or depressions on bottom housing 216 in order to engage bottom housing 216.

Flange 226 may be located at one end of the core of spool 210, and flange 228 may be located at another end of spool 210 to facilitate wrapping trimmer line 110 around spool 210. Projection 224 may be located on flange 226. Flanges 226 and 228 may be circular and disc shaped bounding the placement of trimmer line 110. In an embodiment, spool 210 also has an intermediate flange (which includes channel 214) and which divides spool 210 into multiple chambers (that are open to the inside walls of trimmer head 108) or regions for storing trimmer line 110.

Projection 230 may be located on flange 228. In the currents configuration, projection 230 may engage a depression in the bottom of the top housing 208 that prevents spool 210 from rotating if turn-knob 218 is pressed inward against mechanical bias 212 during operation. Consequently, during operation spool 210 may only release trimmer line 110 when spool 210 is not resting on the top or bottom housing 216 or on the bottom of top housing 208, which limits how much trimmer line 110 is released during operation by tapping or bumping the bottom of turn-knob 218.

If spool 210 is flipped over, and if the direction of rotation of motor 102 (and therefore of driveshaft 202) is reversed, then projection 230 serves the same function as projection 224 serves in the current configuration (engaging bottom housing 216), and projection 224 serves the same function as projection 230 serves in the current configuration (engaging top housing 208). Presently available spool trimmer head assemblies (in which the trimmer line may be wound onto a spool without disassembly of trimmer head housing, to reload trimmer line onto the inner spool) are "unidirectional" and can only function properly on a trimmer machine that turns the driveshaft arbor in one specific direction (clock-wise or counter clockwise). In contrast, trimmer line spool 210 may be received in the trimmer head housing with either spool flange 226 or spool flange 228 in operative engagement with the inner surface of bottom housing 216. That is, spool 210 may be selectively placed in a desired orientation in bottom housing 216 depending on the direction of rotation of the driveshaft of the trimmer apparatus with which trimmer head 108 is intended to be used. In an alternative embodiment, projections 224 or 230 may be located on bottom housing 216 and depressions (e.g., between ribs) may be located on spool 210. Opening 232 is a hole placing a stop. The stop is not shown in FIG. 2, but is discussed below in conjunction with FIGS. 3, 13, and 14.

Exploded View of Trimmer Head

FIG. 3 shows an exploded view of an embodiment of trimmer head 108, having driveshaft 202, eyelets 204, fastener 206, top housing 208, mechanical bias 212, spool 210, turning-knob 218, bottom housing 216, spool cover 302, and stop 332. Stop 332 may include cover 304 and peg 306. In other embodiments, trimmer head 108 may not have all of the elements listed and/or may have other elements instead of or in addition to those listed.

FIG. 3 is an exploded view of trimmer head parts in trimmer head 108. Trimmer head 108, driveshaft 202, eyelets 204, fastener 206, top housing 208, and mechanical bias 212 were discussed in conjunction with FIG. 2. Spool cover 302 covers one side of spool 210. In an embodiment, the curved channel 1104 (FIG. 11A) or a portion of the curved channel is formed within spool cover 302 on the side facing spool 210. In an embodiment, an open side of the channel 1104 (FIG. 11A) within spool cover 302 faces spool 210. In an embodiment, the channel is formed partly within spool cover 302 and partly within spool 210. In another embodiment, the channel is in spool 210 and optionally, spool cover 302 covers the channel.

Peg 306 is attached to spool 210 and cover 304 covers peg 306 to hold peg 306 in place. The combination of peg 306 and cover 304 form stop 332, which hinders or prevent placing spool 210 into trimmer head 108 in the wrong orientation with respect to the direction of rotation of motor 102. Peg 306 may also support cover 304 so that cover 304 is less likely to break (than were cover 304 used alone as stop 332) if for example users attempt to assemble trimmer head 108 with spool 210 in the wrong orientation despite the presence of stop 332.

To elaborate further on the function of stop 332, in an embodiment, stop 332 (FIGS. 3, 13, and 14) may be placed in openings in spool 210 to block or inhibit the misplacement of spool 210 in the trimmer head housing 216, incorrectly. In other words, since the proper end of spool 210 to place upwards depends on the direction that motor 102 causes driveshaft 202 to spin, once the proper orientation of spool 210 is determined for the direction of rotation of motor 102, stop 332 may be used to mark the correct orientation of spool 210. Stop 332 is optional. In an alternative embodiment, no method of marking the correct orientation of spool 210 is included. In an embodiment, turning-knob 218 is releasably attached to spool 210 instead of or in addition to using stop 332 to mark the correct orientation of spool 210 for the intended vegetation trimmer. Stop 332 is optional.

FIG. 3 shows that driveshaft 202 is placed through the top of top housing 208. Driveshaft 202 is secured to top housing 208 via fastener 206. Eyelets 204 are secured to bottom housing 216. Stop 332 is secured the side of spool 210 that faces upward, spool cover 302 is secured to one side of spool 210 (which is independent of whether that side faces up or down), and turning-knob 218 is attached to the side of spool 210 that faces downward.

Turning-knob 218 is set resting on bottom housing 216, protruding through an opening in the bottom of bottom housing 216. Mechanical bias 212 is placed within top housing 208, which pushes against spool 210, and then top housing 208 and bottom housing 216 are releasably fastened together.

Fully Assembled Trimmer Head

FIG. 4 shows a perspective view of an embodiment of trimmer head 108. Perspective view shows eyelets 204, top housing 208, bottom housing 216, turning-knob 218, bottom ring portion 402, tabs 404, and grip 406. In other embodiments, perspective view 300 may not have all of the elements listed and/or may have other elements instead of or in addition to those listed.

FIG. 4 shows an exterior isometric view of the fully assembled trimmer head 108. Eyelets 204, top housing 208, bottom housing 216, and turning-knob 218 were discussed above in conjunction with FIG. 2. Bottom ring 402 is a portion of bottom housing 216. Turning-knob 218 protrudes through an opening formed by bottom ring 402. Tabs 404 are attached to bottom housing 216 and engage in openings on the side of top housing 208. Tabs 404 are an example of a fastener. Tabs 404 may be generally stiff yet resilient and project upward from the bottom housing 216. Tabs 404 releasably attach top housing 208 to bottom housing 216. Tabs 404 are discussed below in conjunction with FIGS. 5 and 6. Grip 406 is the grip portion of turning-knob 218. Grip 406 is the portion of turning-knob 218 that the user grabs to turn the spool and line up channel 214 of spool 210 with eyelets 204 so that a new trimmer line can be inserted. Grip 406 is also the portion of spool 210 that the user grips while turning turning-knob 218 to wind trimmer line 110 onto spool 210.

Bottom Housing

Figure 5:
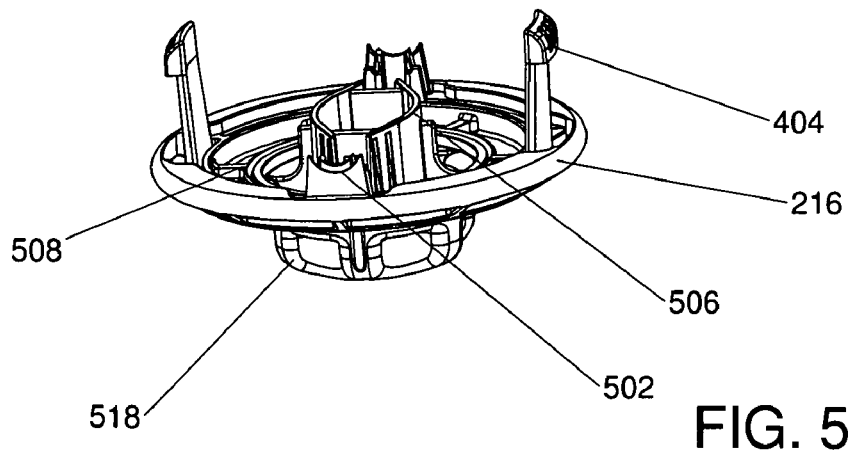
FIG. 5 shows a perspective view of an embodiment of the bottom portion of the housing with the turning knob.

FIG. 5 shows a perspective view of an embodiment of bottom housing 216 having eyelet supports 502, extension 506, and ribs 508. Turning-knob 518 is seated within bottom housing 216 of FIG. 5. In other embodiments, bottom housing 216 may not have all of the elements listed and/or may have other elements instead of or in addition to those listed.

Eyelet supports 502 support and hold eyelets 204 (FIGS. 2 and 3) in place in trimmer head 108 (FIGS. 1-3). When spool 210 engages bottom housing 216 (as a result of being pushed against bottom housing 216 by mechanical bias 212), extension 506 may support the portion of the channel that is within the core of spool 210. Extension 506 is the upper portion of turning-knob 518, which engages spool 210. Extension 506 is a top portion of turning-knob 518. Extension 506 may also be referred to as the drive portion of turning-knob 518, because, when rotated, extension 506 causes spool 210 to rotate as a result of being inserted into a socket in spool 210 that mates with extension 506 Extension 506 may be a noncircular collar. Ribs 508 keep spool 210 from rotating when spool 210 is pushed against bottom housing 216 by mechanical bias 212. Between ribs 508 are depressions. The depressions, ribs 508, and projections 224 and 230 form a latching mechanism that prevents spool 210 from rotating when resting against bottom housing 216.

Turning-knob 518 is a different embodiment of the turning knob than turning knob 218. Turning-knob 518 is discussed in conjunction with FIG. 9, below. In general, any place where turning-knob 518 is referenced turning knob 218 may be substituted, and any place where turning-knob 218 is referenced turning knob 518 may be substituted. However, the embodiment of stop 332 illustrated in FIG. 3 is used in combination with turning-knob 218 and not in combination with turning-knob 518.

Figure 6:
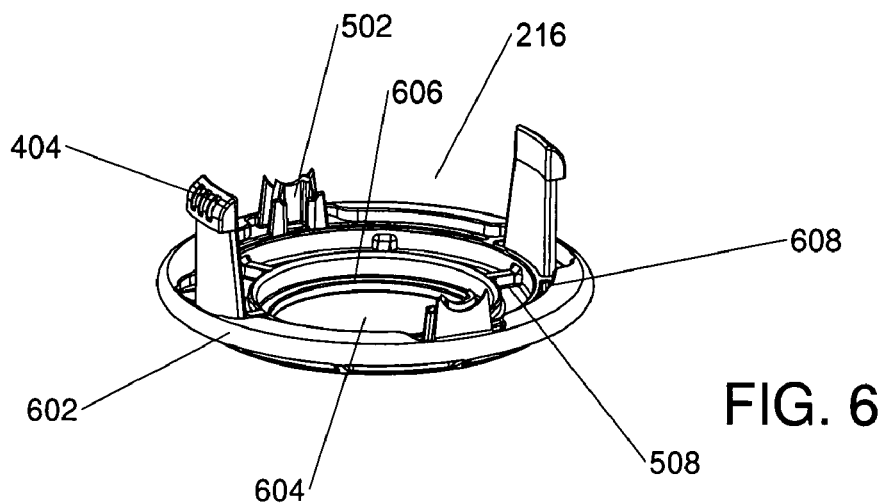
FIG. 6 shows perspective view of an embodiment of the bottom portion of the housing without the turning knob.

FIG. 6 shows a perspective view of an embodiment of bottom housing 216 having eyelet supports 502, ribs 508, flange 602, central aperture 604, circular seat 606, and depressions 608. In other embodiments, the perspective view of FIG. 6 may not have all of the elements listed and/or may have other elements instead of or in addition to those listed.

FIG. 6 is a top isometric view of bottom housing 216 of trimmer head 108. Bottom housing 216 was discussed in conjunction with FIGS. 2-4. Eyelet supports 502 and ribs 508 were discussed in conjunction with FIG. 5. Flange 602 supports top housing 208 while top housing 208 (FIG. 2) is attached to bottom housing 216. Center aperture 604 is an aperture that is in the center of bottom housing 216 through which turning-knob 218 (FIG. 2) protrudes. Circular seat 606 is ring surface at the bottom of bottom housing 216. Circular seat 606 supports turning-knob 218 keeping the upper portion of turning-knob 218 within trimmer head 108 (FIG. 1). Depressions 608 are the depressions formed the space between ribs 508, which engage projections 224 of spool 210 to stop spool 210 from rotating.

Counterclockwise Side of Spool

Figure 7:
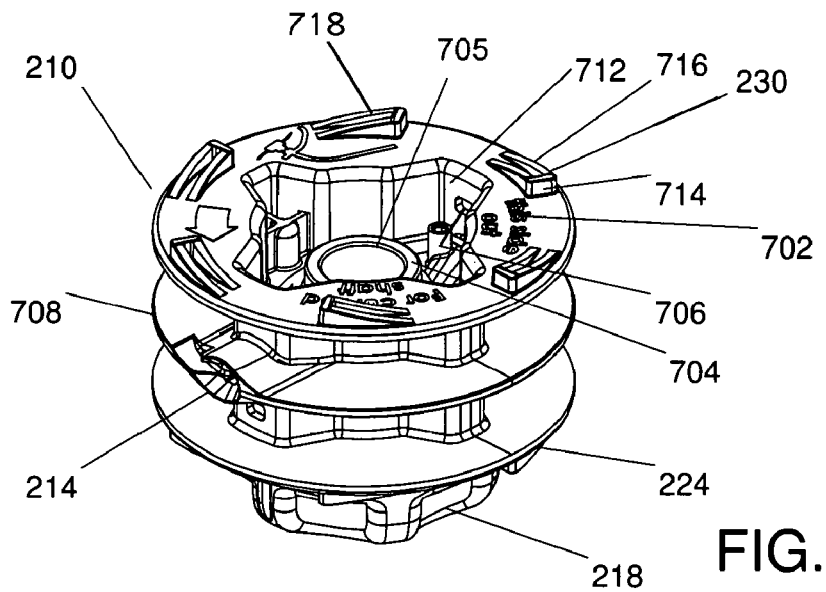
FIG. 7 shows a perspective view of an embodiment of the spool.

FIG. 7 shows a perspective view of an embodiment of the counterclockwise side of spool 210 having channel 214, turning-knob 218, projections 224 and 230 having legends 702, opening 704, circular collar 705, opening 706, intermediate flange 708, and sockets 712. Projections 230 have stop face 714 and arcuate top 716. In other embodiments, counterclockwise side spool 210 may not have all of the elements listed and/or may have other elements instead of or in addition to those listed.

FIG. 7 is an isometric view of spool 210 with turning-knob 218 attached as also shown in FIG. 2. Spool 210, channel 214, turning-knob 218, projections 224 and 230 were discussed in conjunction with FIG. 2. In FIG. 7, spool 210 has the counter clockwise legend facing upwards, and will rotate counter clockwise if oriented with the counter clockwise legend facing up.

Legends 702 mark which direction motor 102 needs to rotate trimmer head 108 in order for vegetation trimmer 100 to operate properly when spool 210 is inserted with the side with legends 702 facing up. There are many different texts that may be included in legend 702 to indicate how to orient spool 210. For example, legend 702 may refer to a structural feature that tends to accompany a clockwise or counter clockwise rotation. For instance, legend 702 may include the text "this side out for curved shaft", "this side up for curved shaft", "this side down for straight shaft", and/or "this side out for straight shaft" if curved shaft and straight shaft vegetation trimmers tend to spin the spool in opposite directions. Similarly, legend 702 may include a text that states that "this side" should be "up" or "out" ("down" or "in") for "clockwise" ("counterclockwise") "rotation" or "this side" should be "down" or "in" ("up" or "out") for "clockwise" ("counterclockwise") "rotation". The opposite side of spool 210 may state the converse directions.

Opening 704 receives extension 220 and allows extension 220 to pass through spool 210. Circular collar 705 forms opening 704. In an embodiment, other than projections 224 and 230, either spring 212 should be free to rotate with respect to circular collar 705 and/or top housing 208, so that while neither of projections 224 or 230 are engaged and preventing spool 210 from rotating, spool 210 may rotate with respect to the rest of trimmer head 108, and release trimmer line. For example, one may be tempted to place buttresses against collar 705 to structurally strengthen collar 705. However, the buttresses may hinder the rotation of spool 210 with respect to the rest of trimmer head 108 if mechanical bias 212 is anchored to top housing 208. In an embodiment, opening 706 is for inserting a tab from turning-knob 218 and thereby fastening turning-knob 218 to spool 210. In an embodiment opening 706 is for fastening stop 332.

Intermediate flange 708 divides spool 210 into two chambers. Intermediate flange 708 includes channel 214 (FIG. 2), which may be a portion of a passageway or channel that guides trimmer line 110 around driveshaft 202 (FIG. 2). Socket 712 receives extension 506 (the top portion of turning-knob 218) and socket 712 may interlock with turning-knob 218 (FIG. 2) so that turning-knob 218 spins with spool 210. At the bottom of socket 712 is a floor upon which circular collar 705 is formed. The combination of the floor of socket 712 and the structures that or formed upon the floor of socket 712 may be referred to as an abutment. Mechanical bias 212 rests upon, and pushes against, the abutment within socket 712. Stop face 714 of tabs 718 prevent spool 210 from rotating in a direction that is opposite that of the arrow of legend 702 by latching a structure on top housing 208 (FIG. 2) or bottom housing 216. Sloped top 716 of tabs 718 allow spool 210 to rotate in the direction of the arrow of legends 702. The arc shape of sloped top 716 allows tabs 718 to slide over and past the latching structure in top housing 208 and bottom housing 216 (FIG. 2).

Figure 8:
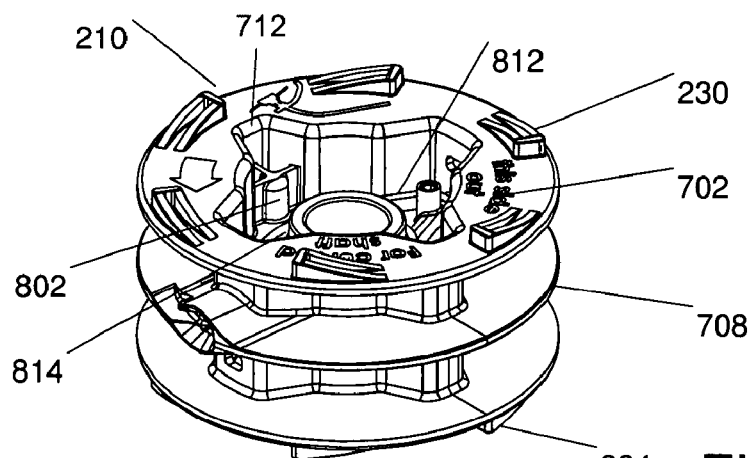
FIG. 8 shows another perspective view of an embodiment of the spool.

FIG. 8 shows another perspective view of an embodiment of counterclockwise side spool 210, projections 224 and 230, sockets 712, knob 802, noncircular collar 812, and plate 814. In other embodiments, counter clockwise side spool 210 may not have all of the elements listed and/or may have other elements instead of or in addition to those listed.

FIG. 8 is an isometric view of spool 210 not attached to turning-knob 218 as shown in FIG. 7. Spool 210, channel 214, projections 224 and 230 were discussed in conjunction with FIG. 2. In FIG. 8, spool 210 also has the counter clockwise legend facing upwards, and will rotate counter clockwise if oriented with the counter clockwise legend facing up. Sockets 712 were discussed in conjunction with FIG. 7. Knob 802 is optional, and has walls extending to the walls of socket 712, which prevent a user from inserting turning knob 218 in an orientation that is perpendicular to an intended orientation. Additionally mechanical bias may rest on spool 210 wrapped around circular collar 705, which may maintain mechanical bias 212 in stable orientation during operation of trimmer head 108. Noncircular collar 812 may serve as an abutment upon which a similar noncircular collar or extension attached to turning-knob 218 may rest. Plate 812 supports circular collar 705, knob 802, and noncircular collar 812. Plate 814 and/or the combination of plate 814 and the entire structure supported by plate 814 may also be referred to as an abutment.

Turning Knob

Figure 9A:
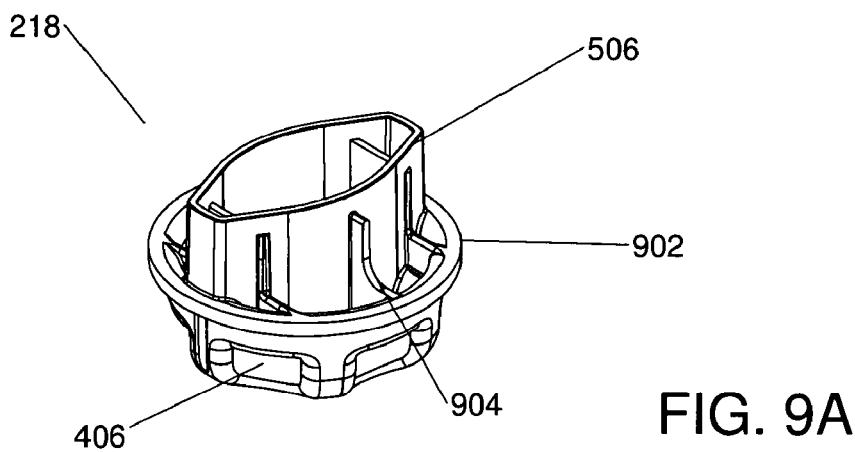
FIG. 9A shows a perspective view of an embodiment of the turning knob.

FIG. 9A shows a perspective view of turning-knob 218 having grip 406, extension 506, flange portion 902, and ribs 904. In other embodiments, the view may not have all of the elements listed and/or may have other elements instead of or in addition to those listed.

FIG. 9A is a top isometric view of turning-knob 218 as shown in trimmer head FIGS. 2 and 3. Turning-knob 218 was discussed in conjunction with FIG. 2. Grip 406 was discussed in conjunction with FIG. 4. Extension 506 was described in conjunction with FIG. 5. Flange portion 902 rests on seat 606 of bottom housing 216, and prevents turning-knob 218 from falling through bottom housing 216. Ribs 904 strengthen the structure of turning-knob 218 and extension 506. The view of turning-knob 218 is clearer than that of FIGS. 2-4 and 6.

Figure 9B:
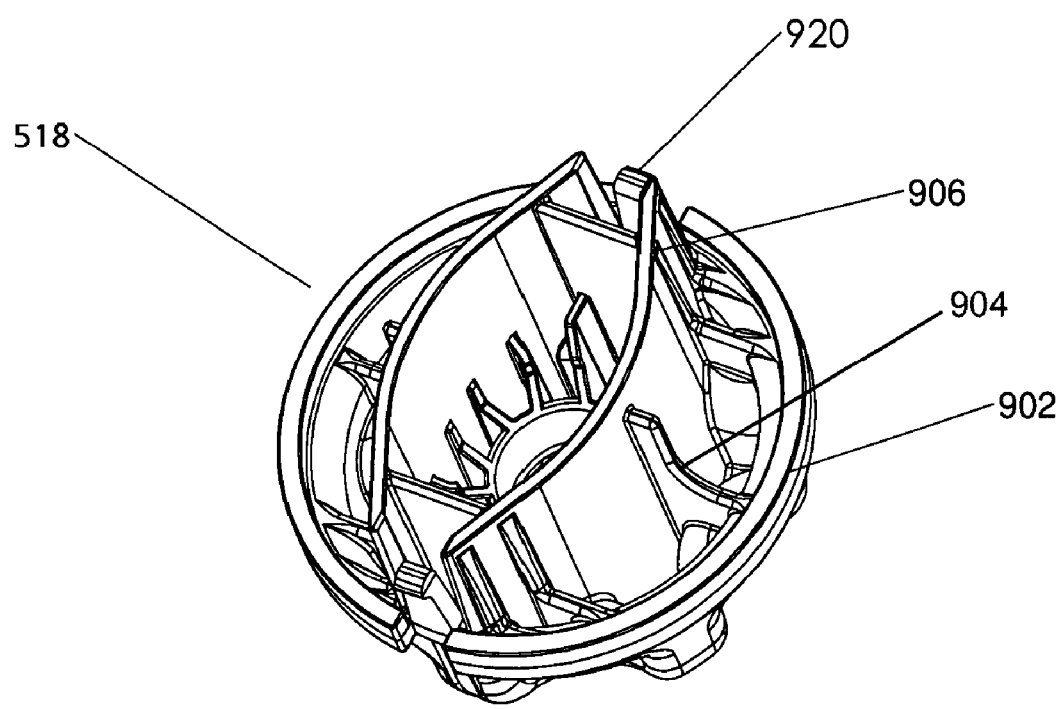
FIG. 9B shows a perspective view of an embodiment of the turning knob.

FIG. 9B shows a perspective view of turning-knob 518 having grip 406, flange portion 902, and ribs 904, extension 906, and tabs 920. In other embodiments, turning-knob 518 may not have all of the elements listed and/or may have other elements instead of or in addition to those listed.

FIG. 9B is a top isometric view of turning-knob 518, which is similar to turning-knob 218 which in turn was discussed in conjunction with FIGS. 2-4, 6, and 9A. By attaching turning-knob 518 to spool 210 in a manner such that spool 210 and turning-knob 518 are not separated from one another by simply lifting one or moving one of turning-knob 518 or spool 210.

Grip 406 was discussed in conjunction with FIG. 4. Flange portion 902 and ribs 904 were discussed in conjunction with FIG. 9A. Extension 906 is similar to extension 506, which was described in conjunction with FIG. 5. Tabs 920 interlock, and thereby releasably connect with spool 210 (FIG. 2), via opening 706 (FIG. 7). Although extension 506 forms a continuous noncircular collar, extension 906 forms a non-continuous noncircular collar that is interrupted by tabs 920.

Turning-knob 518 is attached to spool 210 so that if the interlocking between spool 210 and turning-knob 218 is not actively undone (e.g., by pushing tabs 920 out of openings 706 and pulling turning-knob 218 away form spool 210) one would expect turning-knob 218 to remain attached to spool 210. Turning-knob 218 is attached to spool 210 with a strong enough connection to hinder placing spool 210 into trimmer head 108 in an orientation that is inappropriate for the direction of rotation of the motor.

Figure 9C:
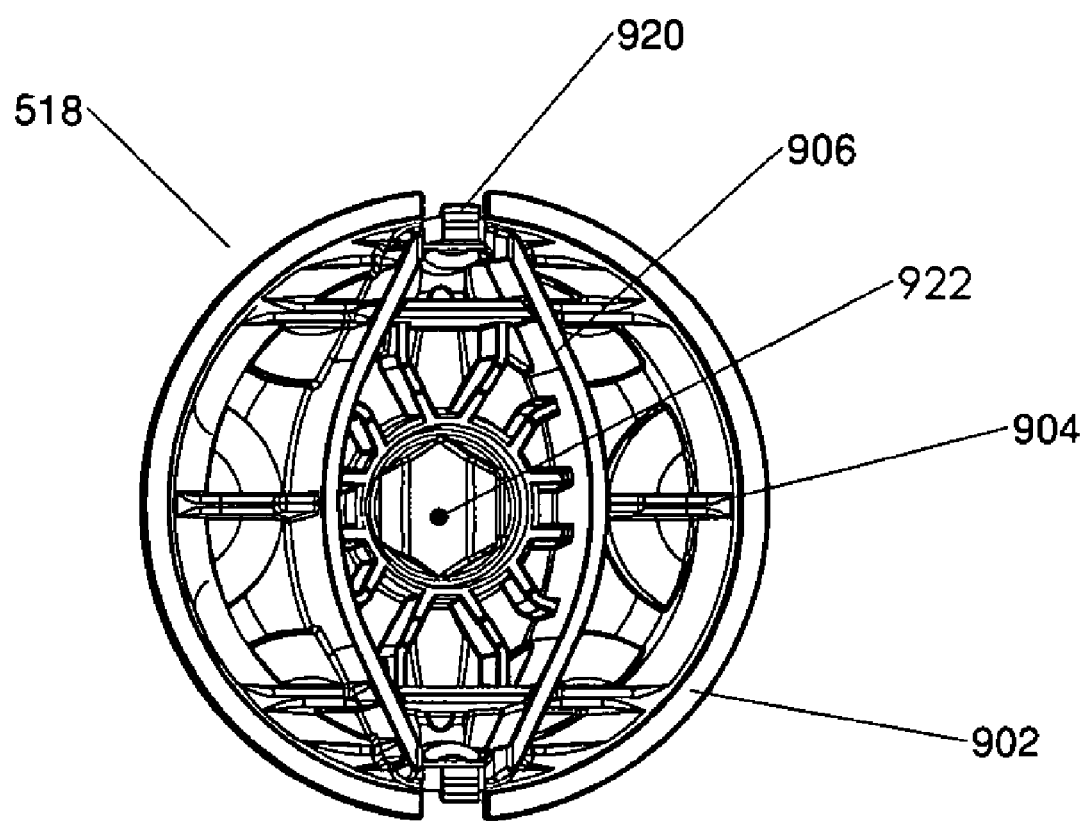
FIG. 9C shows a top view of an embodiment of the turning knob.

FIG. 9C shows a top view of an embodiment of turning-knob 518 having extensions 906, flange portion 902, ribs 904, tabs 920, and depression 922. In other embodiments, view 900 may not have all the elements listed and/or may have other elements instead of or in addition to those listed. FIG. (C is a top isometric view of turn-knob 518 which was discussed in conjunction with FIG. 9B. Grip 406, flange portion 902, and ribs 904 were discussed in conjunction with FIGS. 4, 5 and 9A, respectively.

Extension 906 is similar to extension 506, which was described in conjunction with FIG. 5. Flange portion 902, ribs 904, extension 906, and tabs 920 were discussed in conjunction with FIGS. 9A and 9B. Depression 922 is shaped to mate with an end portion of a bolt or screw that holds at least a portion of trimmer head 100 together, such as fastener 206 (in an embodiment in which fastener 206 is a bolt). In an embodiment, depression 922 is a hexagonal depression and may act as a wrench by mating or interlocking with another component of trimmer head 108. In another embodiment, depression 922 has another shape.

Spool Cover

Figure 10:
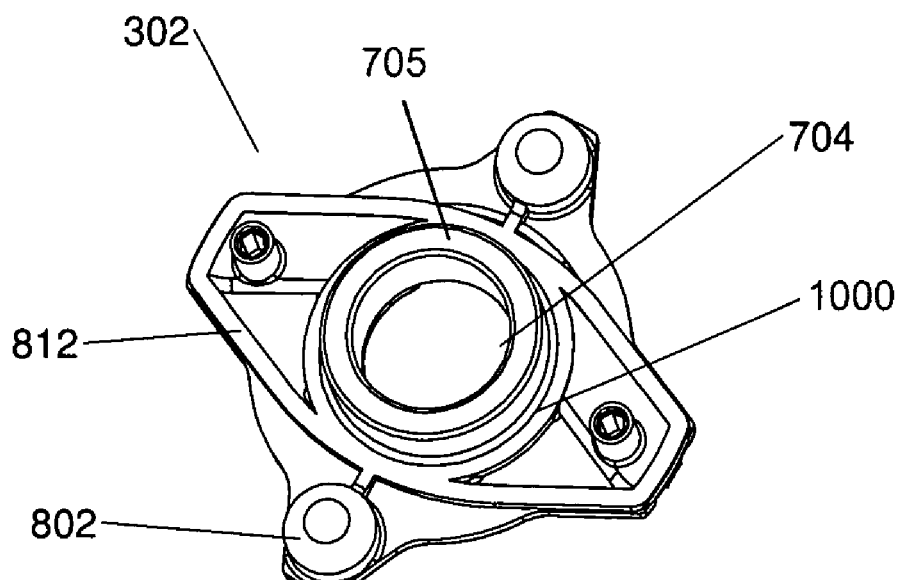
FIG. 10 shows a top view, which is a first side of an embodiment of the spool cover.

FIG. 10 shows a perspective view of a first side 1000 of spool cover 302 having opening 704, circular collar 705, knob 802, and noncircular collar 812. In other embodiments, first side 1000 may not have all of the elements listed and/or may have other elements instead of or in addition to those listed.

FIG. 10 is a bottom isometric view of spool cover 302. First side 1000 faces away from spool 210 when spool cover 302 is attached to spool 210. Opening 704 was described in conjunction with FIG. 7 and knob 802 was described in conjunction with FIG. 8. Noncircular collar 812 serves as an abutment for extension 506. When extension 506 is placed in socket 712, if spool cover 302 is in socket 712, extension 506 may rest on noncircular collar 812. Spool cover 302 has the same, or at least similar, functional features as those within socket 712 of counterclockwise side of spool 210 (such as opening 704, circular collar 705, and noncircular collar 812). Consequently, once spool cover 302 is attached to spool 210 no matter which way spool 210 is inserted into trimmer head 108 or attached to turning-knob 218 or 518, spool 210 and trimmer head 108 function the same way.

Figure 11A:
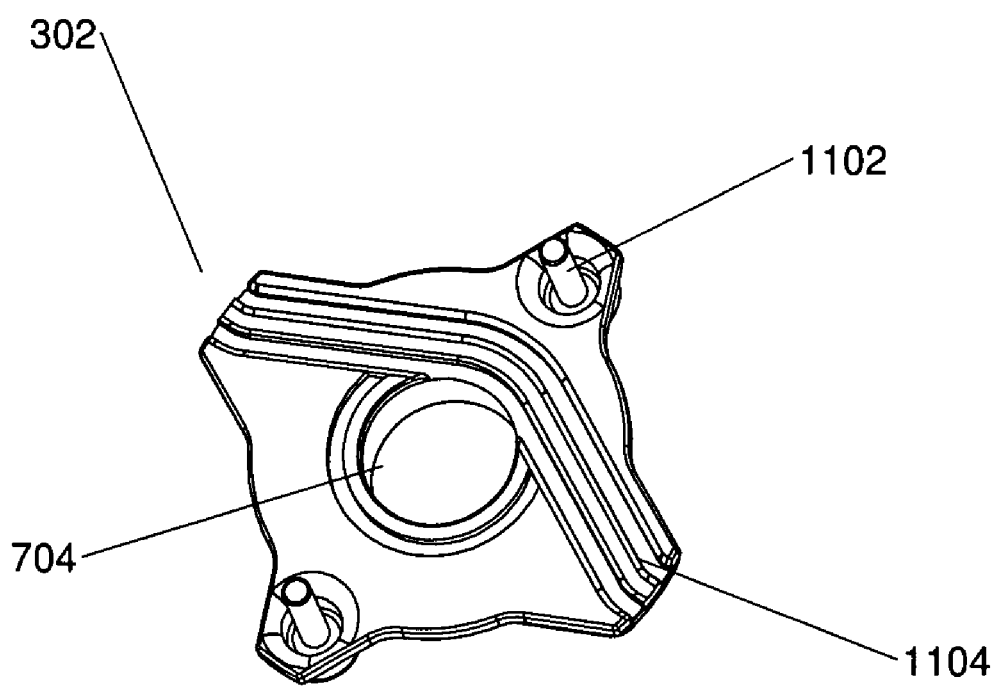
FIG. 11A shows a bottom view, which is a second side of an embodiment of the spool cover.

FIG. 11A shows a perspective view 1100 of spool cover 302, having opening 704, posts 1102, and channel 1104. In other embodiments, spool cover 302 may not have all of the elements listed and/or may have other elements instead of or in addition to those listed.

FIG. 11A is a bottom isometric view of spool cover plate 302. The perspective view shows the side of spool cover 302 that faces spool 210 when spool cover 302 is attached to spool 210. Opening 704 was described in conjunction with FIG. 7. Channel 1104 is placed up against the bottom of spool cover 302. Channel 1104 guides trimmer line 110 from channel 214 on one side of spool 210 to the channel 214 on the other side of spool 210. In an embodiment, on the sides of channel 1104 are recesses for accepting walls of the channel, which is located within the core of spool 210. Alternatively, channel 1104 may have walls that meet a corresponding pair of walls, or are received within a corresponding pair of recesses, within the core of spool 210. Channel 1104 is curved to guide trimmer line 110 around driveshaft 202. In an embodiment, posts 1102 (which may also be referred to as pegs) are received in openings that are on the other side of knobs 802 (FIG. 8). Posts 1102 and the openings engage one another to hold spool cover 302 and spool 210 together. Although in the specification, the side of spool 210 that attaches to spool cover 302 is the counter clockwise side, the clockwise side of spool could be fashioned to receive spool cover 302 in addition to or instead of the counterclockwise side of spool 210.

Channel Geometry

Figure 11B:
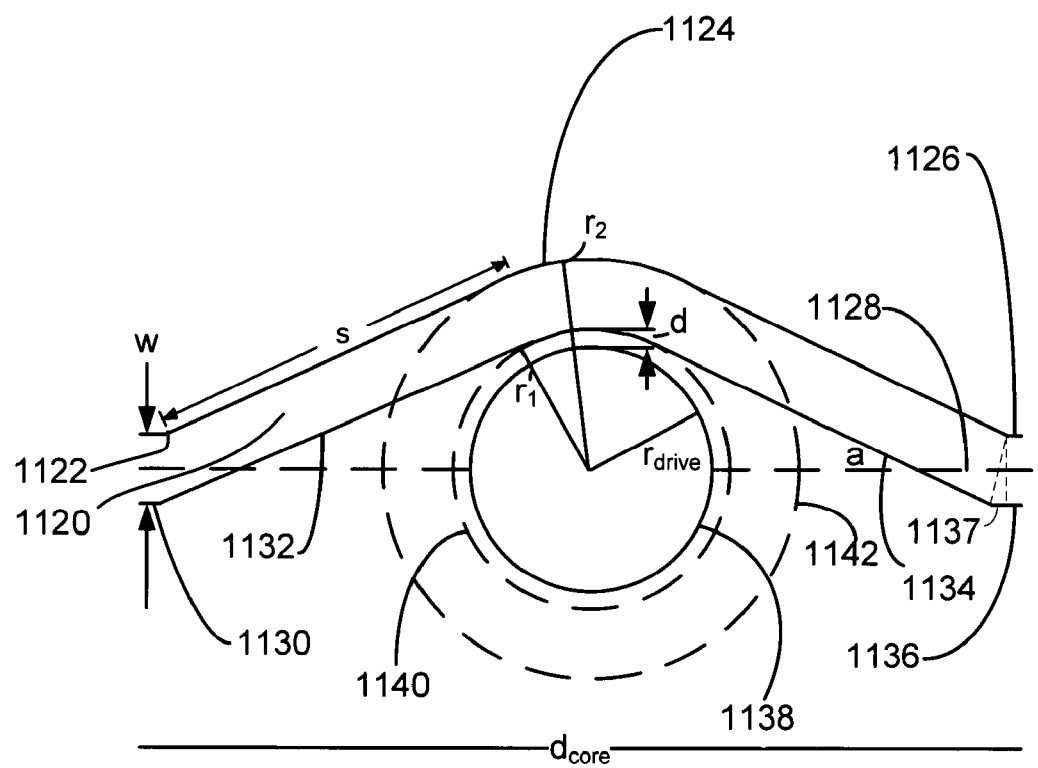
FIG. 11B shows a diagram of an embodiment of a curved channel that may be used in the spool.

FIG. 11B shows a diagram of a channel 1120 that illustrates some possible features of the channel. Channel 1120 may include bends 1122, 1124, and 1126, center axis 1128, optional straight portions 1130, 1132, 1134, and 1136, wall section 1137, driveshaft hole 1138, and imaginary circles 1140 and 1142, distance d, distance s, channel width w, driveshaft radius $r_{drive}$, inner radius of curvature $r_1$, outer radius of curvature $r_2$, core diameter $d_{core}$, and angle a. In other embodiments, channel 1120 may not have all of the features listed and/or may have other features instead of or in addition to those listed.

Channel 1120 is an embodiment of a curved channel, which may be an embodiment of channel 1104. Channel 1120 will work for trimmer line having a diameter of at least 1" or less. Bends 1122 and 1126 are located near or at the apertures in the core of the spool and open into the apertures. In an embodiment bends 1122 and 1126 have a radius of curvature of 0.16" at the center of channel 1120. In other words, in this embodiment, if a line is drawn down the center of channel 1120, the line will have a radius of curvature of 0.16" at bends 1122 and 1126. In other embodiments, bends 1122 and 1126 may be the junction of two straight sections that are angled with respect to one another without a smooth bend or may have a bend with a somewhat larger or small radius of curvature. Bend 1124 is located close to the driveshaft hole. In an embodiment, the edge of bend 1124 facing the driveshaft hole is flush with the edge of the driveshaft hole.

Center axis 1128 is an imaginary line connecting the center of the aperture at one side of the core with center of an aperture on the opposite side of the core. Optional straight portion 1130 connects one aperture to bend 1122. Optional straight portion 1132 connects bend 1122 to bend 1124. In an embodiment, bend 1124 has a radius of curvature of 0.45" at the center of channel 1120. Optional straight portion 1134 connects bend 1124 to bend 1126. Optional straight portion 1136 connects one aperture to bend 1126. Optional wall section 1137 is a section of the wall of channel 1120, which, in an embodiment, is straight and is present even if optional straight portion 1136 is not present. Channel 1120 may have a wall section associated with bend 1122 that is similar to (is a mirror image of) wall section 1137. Driveshaft hole 1138 is a hole through which the driveshaft extends. Driveshaft radius $r_{drive}$ is the radius of driveshaft hole 1138, which is a little larger that the radius of the drive shaft. In an embodiment, driveshaft radius $r_{drive}$ is 0.38" or 0.338". Core diameter $d_{core}$ is the diameter of the core of the spool, which in an embodiment is 3". Width w is the width of the channel. In an embodiment, width w is 0.26". In an embodiment, the thickness of the walls of the channel are 0.08". Distance d is the distance from the edge driveshaft hole to the outer edge of channel 1120 that faces the driveshaft hole 1138. In an embodiment, d is 0.0".

Inner radius of curvature $r_1$ is the radius of curvature of portion of channel 1120 that faces towards driveshaft hole 1138, and outer radius $r_2$ is the radius of curvature of the outer surface of channel 1120 that faces away from driveshaft hole 1138, which are measures of the curvature of surfaces facing towards and away from driveshaft hole 1138. Inner radius $r_1$ is radius of imaginary circle 1140, and outer radius r2 is the radius of imaginary circle 1142, which are both concentric with one another and drive shaft hole 1138. In an embodiment, inner radius $r_1$ is set to $r_1=r_{drive}+d$, and outer radius is set to $r_2=r_{drive}+d+w$.

The configuration of channel 1120 is constrained by core diameter $d_{core}$, drive radius $r_{drive}$, channel width w, and smallest practical size for distance d. In an embodiment, the ratio of $d_{core}$ to $2r_{drive}$ is between 3.2 and 3.5, or about 3.48. In an embodiment, $d_{core}$ is 3", the smallest practical size for d is 0.0", $r_{drive}$ is 0.38", and w is at least 0.26", depending on the wall thickness and the largest diameter trimmer line for which trimmer head 108 is designed. In an embodiment 0.26" is the width between the two inner surfaces of the walls of channel 1120. The width between the two inner surfaces of the walls of channel 1120 need to be wider than the diameter of the largest trimmer line that trimmer head 108 accommodates. For example, for 0.1" diameter trimmer line the width between the two inner surfaces of the walls of channel 1120 may be 0.12" to 0.26". In an alternative embodiment, the width between the outer surfaces of channel 1120, width w is 0.26" or wider and the widest trimmer line used is 0.08". If a 0.1" diameter trimmer line is used, either the wall thickness is made slightly less than 0.08" (e.g., 0.75" or 0.78") thick or the width w is at least slightly more than 0.26" wide (e.g., 0.261", 0.265", 0.27", or 0.28" wide). In an embodiment, width w is 0.34". Width w is wide enough so that the largest sized trimmer line can slide through channel 1120 without getting caught on the walls of channel 1120 as a result of the channel being too narrow.

Using the geometry illustrated in FIG. 11B, the length s of the straight portions 1130 and 1136 may be from 0" to 0.51" long (which corresponds to angle a being between 26 and 30 degrees), and channel 1120 is expected to still work if straight portions 1130 and 1136 is 0.6" long. In an embodiment the length of straight portions 1130 and 1136 s is 0.11".

It may be desirable to keep the length of channel 1120 relatively short so that there is less friction hampering threading trimmer line through channel 1120. It may be desirable to keep the maximum angle that the channel makes with a line parallel to central axis 1128 relatively small, so that channel 1120 is relatively close to being as straight as can be expected given the constraints of core diameter $d_{core}$, drive radius $r_{drive}$, channel width w, and the smallest practical size for distance d. It also may be desirable to keep the walls of the channel 1120 smooth, without corners. In view of this last consideration, one might have expected that it would be beneficial to have rounded corners with relatively large radii of curvatures for bends 1122 and 1126. However, the inventor has found empirically that large radii of curvature for bends 1122 and 1126 is not beneficial and do not always work well. It has been found that one class of channel geometries that work, keep angle a small. It has also been found empirically that keeping straight portions 1130 and 1136 short or non-existent can be beneficial. By keeping straight portions 1130 and 1136 short or nonexistent angle a may be kept smaller. In an embodiment angle a is 26 degrees.

In an embodiment, angle a may be as large as at least 30 degrees. Straight portions 1132 and 1134 may be extended from bends 1122 and 1126 so that the outer surfaces of the walls of channel 1120 are tangential or close to tangential to imaginary circles 1140 and 1142, respectively, which allows angle a to be as small as possible for a given location of bends 1122 and 1126. For example, straight portions 1132 and 1134 may be extended from bends 1122 and 1126 so that the outer wall of channel 1120 are tangential or close to tangential to imaginary circles 1140 and 1142, so as to keep the width of channel 1120 a constant value, which is width w. As another example, straight portions 1132 and 1134 may be extended from bends 1122 and 1126 until a center of straight portions 1132 and 1134 are tangential with an imaginary circle concentric with driveshaft hole 1138 that has a radius of $r=(r_1+r_2)/2$ or $r=r_{drive}+d+w/2$. Let the length of straight portions 1130 and 1136 be represented by s. Wall section 1137 has a length of $(w)\sin(a)$. Let the length $L=d_{core}-(w)\sin(a)-2s$. The length of straight portions 1132 and 1134 is $(((L)/2)^2-r^2)^{1/2}$, angle a is $\sin^{-1}(2r/(L))$, the length of bend 1124 is $2ar$, and the length of the entire channel is $2[((L)/2)^2-r^2]^{1/2}+ar]+(w)\sin(a)+2s$. For a fixed driveshaft hole diameter, distance d, channel width w, and length s, the value of angle a that will make channel 1120 tangential to circle 1140 at the point where straight portions 1132 and 1134 meet circle 1140 may be calculated iteratively. As a first approximation, angle a may be taken to be $\sin^{-1}(2r/L)$, which may be approximated $\sin^{-1}(2r/d_{core})$ or more accurately $$a \sim \sin^{-1}[(2r/d_{core})/(1-2rw/d_{core}^2)].$$

In other embodiments, other geometries may be used. For example, straight portions 1132 and 1134 may extend beyond, or may not reach, the point at which straight portions 1132 and 1134 are tangential to imaginary circle 1140. In order to wind trimmer line that is thicker than 1" around a spool, the spool and therefore $d_{core}$ needs to be larger than 3", but the radius of the driveshaft hole 1138 may be kept the same and the thickness of the channel walls may be kept the same. Consequently, extending the length of straight portions 1132 and 1134 and keeping curved portion 1124 as close as possible to (e.g., flush with the edge of) driveshaft hole 1138, channel 1120 will still work.

Figure 11C:
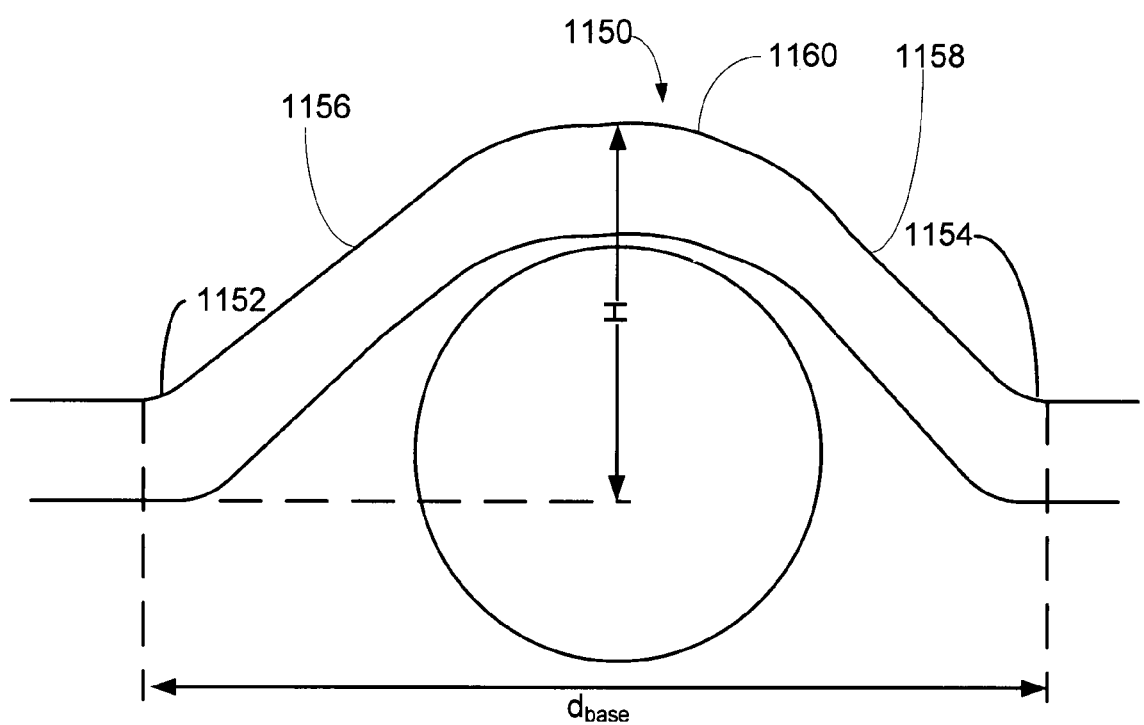
FIG. 11C shows a diagram of an embodiment of a curved channel that may be used in a spool.

FIG. 11C shows another embodiment of a channel 1150, having bends 1152 and 1154, sections 1156 and 1158, curved portion 1160, height H, and base distance $d_{base}$. In other embodiments, channel 1150 may not have all of the elements listed and/or may have other elements instead of or in addition to those listed.

Channel 1150 is another embodiment that illustrates other geometries of the channel. Channel 1150 will work for at least a trimmer line of a diameter of at least 0.085" or less. In channel 1150, bends 1152 and 1154 have a considerable amount of curvature and have a rounded curvature. Sections 1156 and 1158 may also have a considerable amount of curvature, and may not have any straight portion. Curved portion 1160 may have any of a number of different shapes of curvature, such as circular, elliptical, hyperbolic or any of another of different types of curves. In an embodiment, curved portion 1160 may be at least 0.38 inches or less. In an embodiment, the radius of curvature for curved portion 1160 or 1120 may be any of a number of values depending on values of other parameters.

For example, instead of directly controlling the angle a (FIG. 11B), the ratio of height and base distance $d_{base}$ may be adjusted. It is expected that ratio of $H/d_{base}$ may be any number smaller than or equal to 0.37. For an embodiment according to FIG. 11B in which channel 1120 is flush with driveshaft hole 1140, H/dbase is 0.22. Keeping the channel 1120 flush with an imaginary circle concentric with driveshaft hole 1140, keeping the radius of curvature of bends 1122 and 1126 small, and keeping straight portions 1132 and 1134 straight, $H/d_{base}$ may be as high as 0.36 (which corresponds to angle a being 30 degrees), possibly higher. Keeping the channel 1120 flush with an imaginary circle concentric with driveshaft hole 1140, keeping the radius of curvature of bends 1122 and 1126 small, and keeping straight portions 1132 and 1134 straight, requires the radius of curvature to be at least 0.45" for bend 1124 (for a drive hole diameter 0.38" and a width w of 0.34"), but may be as high as 0.7". As some other examples, a channel with $H/d_{base}$ equal to 0.33, with a base width of 2.3", and a radius of curvature for bend 1160 of 0.31 works. Also, $H/d_{base}$ equal to 0.38 with a base width of 1.9", and a radius of curvature 0.38" also works.

Flipping the Spool

Figure 12C:
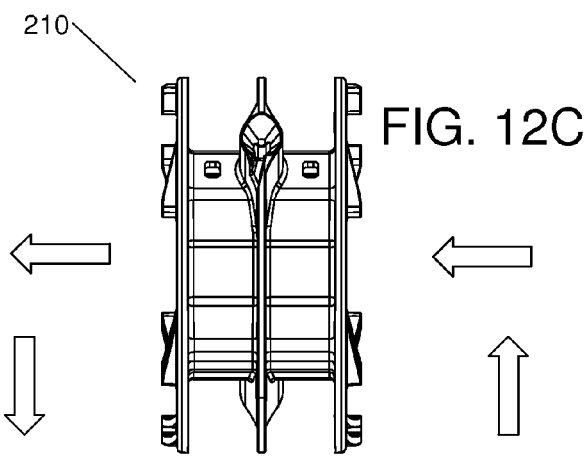
FIGS. 12A-E shows an embodiment of the process of flipping over the spool.
Figure 12D:
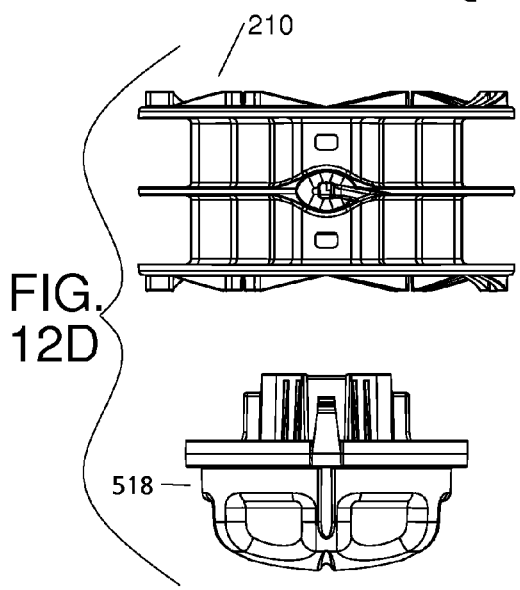
Figure 12B:
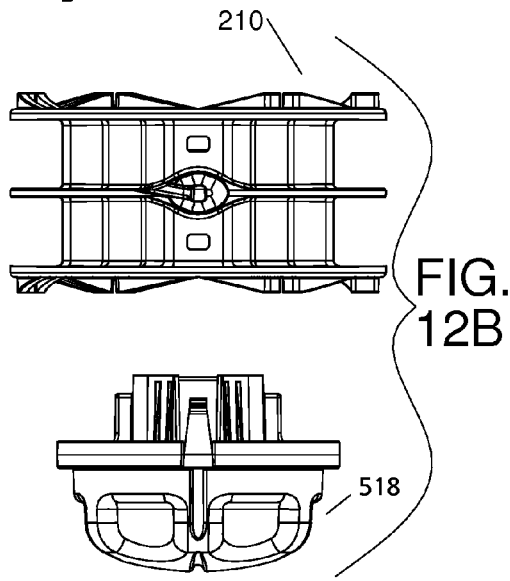
Figure 12E:
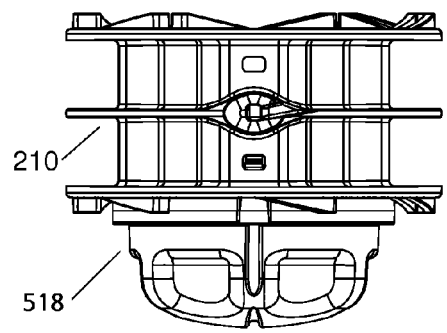
Figure 12A:
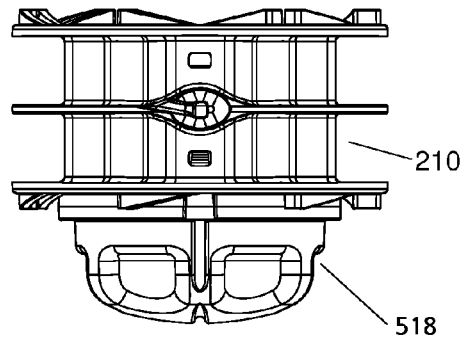

FIGS. 12A-E show the process of flipping over spool 210. In other embodiments, FIGS. 12A-E may not have all of the features listed and/or may have other elements instead of or in addition to those listed. FIG. 12A shows turning-knob 518 attached to spool 210. FIGS. 12A-E include drawings of spool 210 and turning-knob 518 attached and not attached to one another. FIGS. 12A-E illustrate how to convert the same spool so that the trimmer head can be used on a trimmer machine that has a driveshaft that turns in a clockwise and or Counter-clockwise direction. FIG. 12B shows turning-knob 518 and spool 210 after being separated. FIG. 12C shows spool 210 while being flipped over. FIG. 12D shows turning-knob 518 and spool 210 after spool 210 has been flipped and prior to re-attaching turning-knob 518 to spool 210. FIG. 12E shows turning-knob 518 and spool 210 after spool 210 has been attached to turning-knob 518. FIGS. 12A-E demonstrate that either side of spool 210 may be attached to turning-knob 518.

Clockwise Side of Spool with Stop

Figure 13:
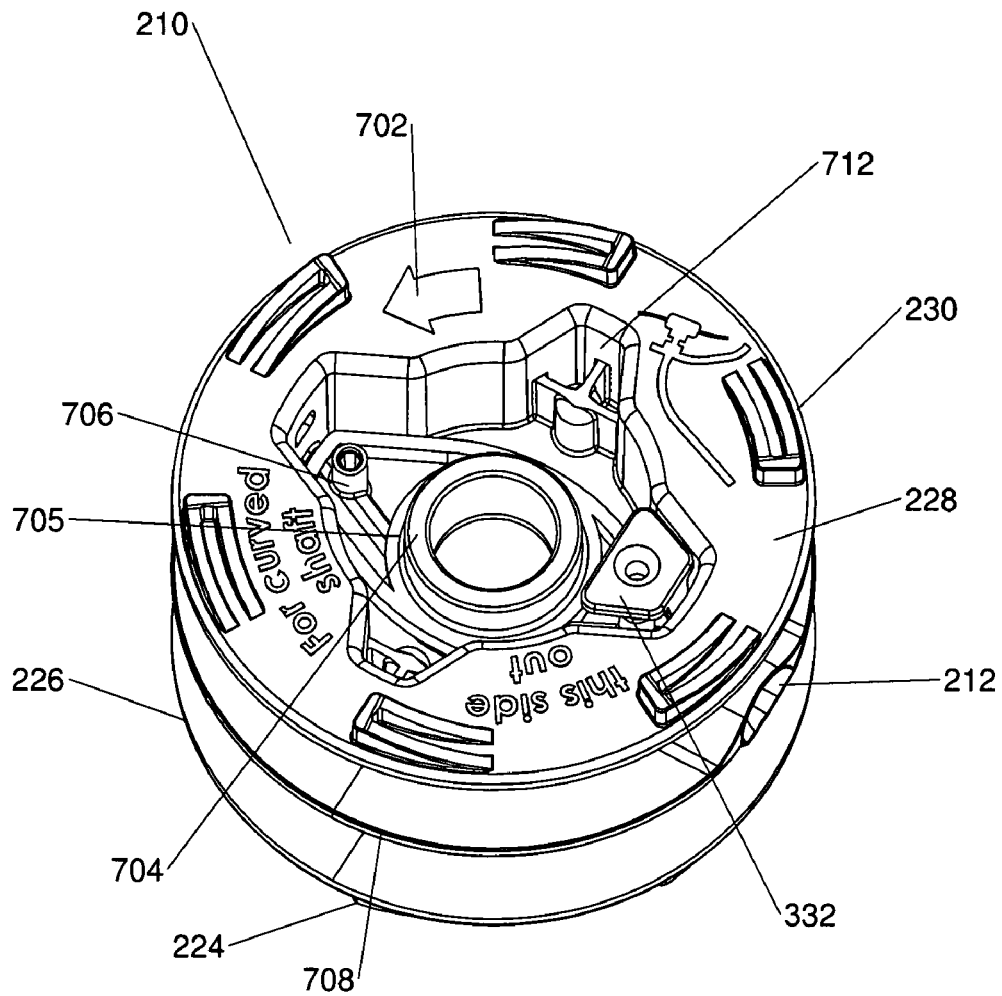
FIG. 13 shows a perspective view of the counter clockwise side of an embodiment of the spool.

FIG. 13 shows a perspective view of the counter clockwise side of spool 210. Spool 210 may include projections 224, flange 226, flange 228, projections 230, stop 332, legends 702, opening 704, collar 705, opening 706, intermediate flange 708, and socket 712. In other embodiments, spool 210 may not have all of the elements listed and/or may have other elements instead of or in addition to those listed.

Spool 210, projections 224, flange 226, flange 228, projections 230, and stop 332 were discussed in FIG. 2. Legends 702, opening 704, opening 706, intermediate flange 708, and socket 712 were discussed in FIG. 7. FIG. 13 shows the placement of stop 332 while stop 332 is connected to spool 210.

Stop

Figure 14:
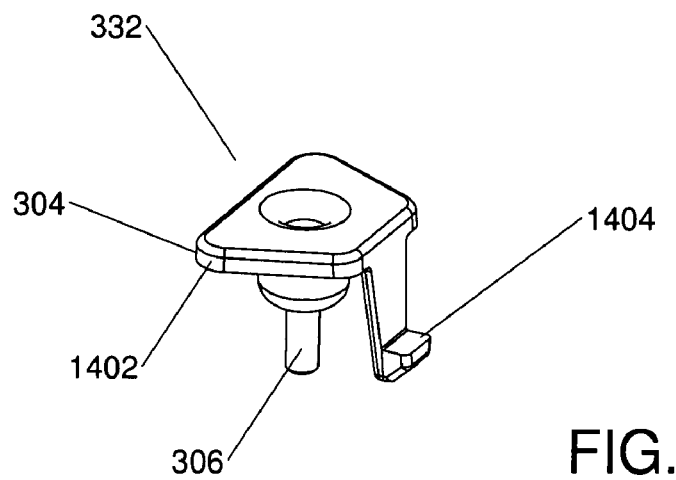
FIG. 14 shows a perspective view of an embodiment of a stop.

FIG. 14 shows a perspective view of an embodiment stop 332. Stop 332 has cover 304 and peg 306, and cover 304 has top 1402 and tab 1404. In other embodiments, stop 332 may not have all of the elements listed and/or may have other elements instead of or in addition to those listed.

Stop 332 was discussed in conjunction with FIG. 2. Cover 304 and peg 306 were discussed in conjunction with FIG. 3. Top 1402 rests on and is supported by peg 306, and tab 1404 extends downward from top 1402 to engage in the inner wall of the core of the spool 210. Once the desired disposition of spool 210 has been determined a small "stop" 332 (FIGS. 3, 13, and 14) can be placed in an opening 706 and openings provided in socket 712 (which is a non-circular opening that is centrally located in spool 210), and after being installed stop 332 acts as a "block" for misplacement of the spool 210 in the trimmer head bottom housing 216, incorrectly. In an embodiment stop 332 is removable (e.g., friction fit) and/or semi-permanent. Stop 332 may be permanently placed or non-permanently placed (e.g., removable). Stop 332 may be made from plastic, an elastic material, such as rubber, or other material.

Clockwise Side of Spool without Spool Cover

Figure 15:
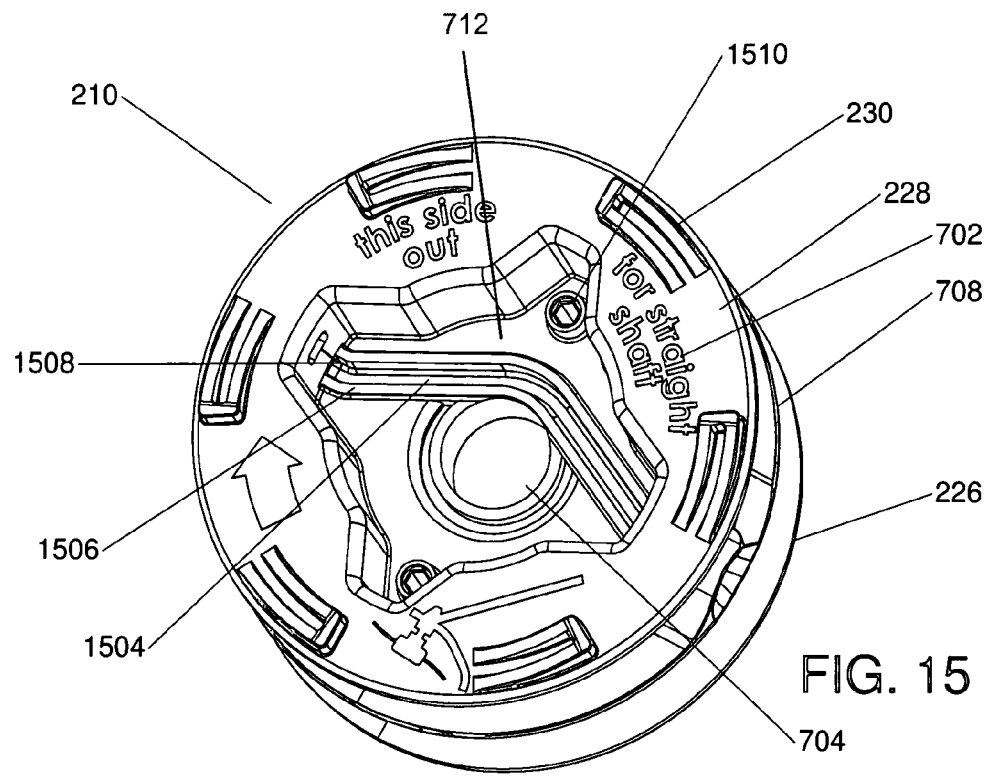
FIG. 15 shows a perspective view of the clockwise side of an embodiment of the spool.

FIG. 15 shows a perspective view of the clockwise side of spool 210 without spool cover 302 attached. Spool 210 may include flange 226, flange 228, projections 230, stop 332, legends 702, opening 704, opening 706, intermediate flange 708, socket 712, channel wall 1504, channel 1506, opening 1508, and opening 1510. In other embodiments, clockwise side of spool 210 may not have all of the elements listed and/or may have other elements instead of or in addition to those listed.

Spool 210, projections 224 and 230 were discussed in FIG. 2. Legends 702, opening 704, opening 706, intermediate flange 708, and socket 712 were discussed in FIG. 7. FIG. 15 shows the clockwise side of spool 210 prior to attaching spool cover 302. Channel wall 1504 is the wall of the portion of the channel formed within spool 210, while channel 1506 is the portion of the channel formed by channel wall 1504. In another embodiment, another portion of the channel 1104 (FIG. 11A) may be located on the spool-side of spool cover 302 (FIG. 3). Opening 1508 receives the flange at tab 1404.

Opening 1510 receives and engages posts 1102 (FIG. 11A), which are on the spool-side of spool cover 302 (FIGS. 6 and 11).

Clockwise Side of Spool with Spool Cover

Figure 16:
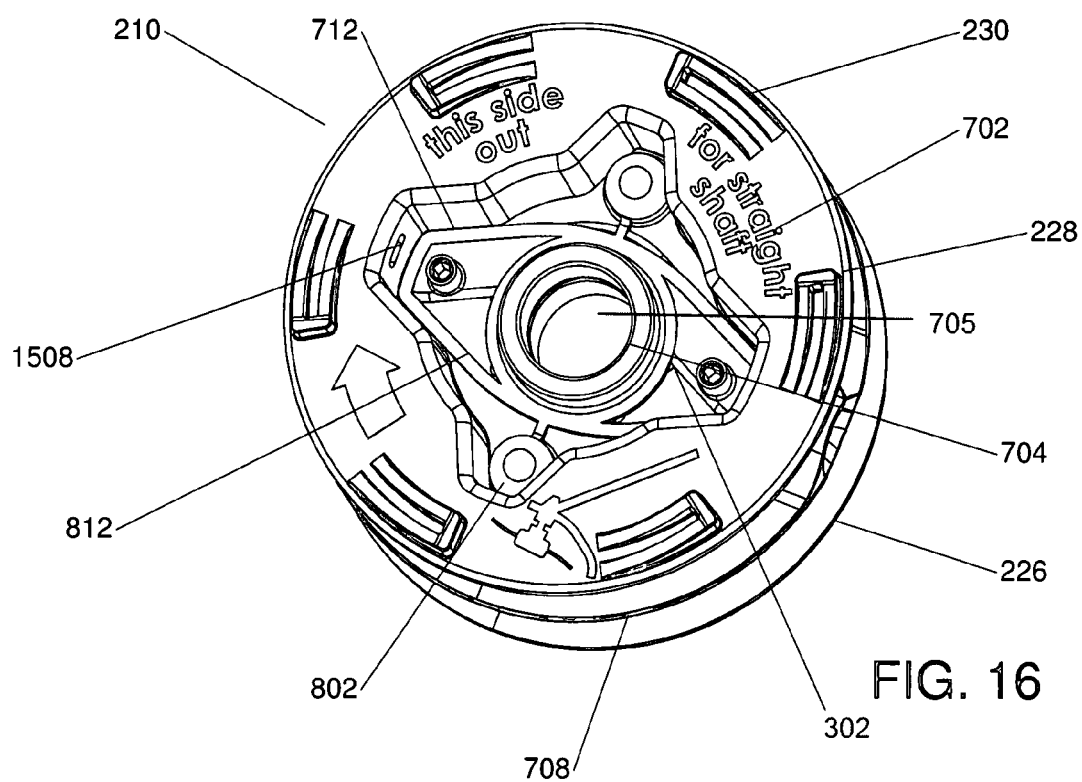
FIG. 16 shows another perspective view of the clockwise side of an embodiment of the spool.

FIG. 16 shows another perspective view of the clockwise side of spool 210. with spool cover 302 attached. Spool 210 may include flange 226, projection 230, spool cover 302, legends 702, opening 704, circular collar 705, intermediate flange 708, socket 712, knob 802, noncircular collar 812, and opening 1508. In other embodiments, clockwise side of spool 210 may not have all the elements listed and/or may have other elements instead of or in addition to those listed.

Spool 210 and projections 224 and 230 were discussed in FIG. 2. Legends 702, opening 704, opening 706, intermediate flange 708, and socket 712 were discussed in FIG. 7. Knob 802, and noncircular collar 812 was discussed in conjunction with FIG. 8. Opening 1508 and opening 1510 were discussed in conjunction with FIG. 15.

Top Housing

Figure 17:
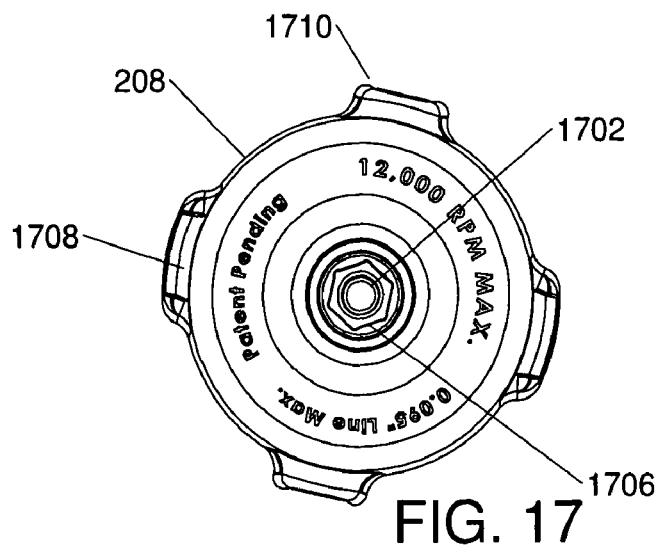
FIG. 17 shows a top view of an embodiment of the top portion of the housing.

FIG. 17 shows a top view of an embodiment of top housing 208. Top housing 208 includes central opening 1702, connector 1706, openings 1708, and eyelet covers 1710. In other embodiments, top housing 208 may not have all of the elements listed and/or may have other elements instead of or in addition to those listed.

Opening 1702 is an opening at the center of the top of top housing 208 through which driveshaft 202 is inserted (FIG. 2). Connector 1706 at least partially connects driveshaft 202 to top housing 208. In an embodiment, connector 1706 is a noncircular opening that is also a seat for an enlarged noncircular portion of driveshaft 202. Connector 1706 mates with the enlarged portion of driveshaft 202, so that when motor 102 causes driveshaft 202 to spin, top housing 208 (and therefore the entire trimmer head 108) spins with driveshaft 202.

Openings 1708 receive and engage tabs 404 that extend from bottom housing 216 releasably securing top housing 208 to bottom housing 216. Tabs 404 (FIG. 4) are adapted to pass through correspondingly shaped openings 1708. At their upper ends tabs 404 preferably have radially outwardly directed lips. As tabs 404 are inserted through openings 1708, the tabs flex radially inwardly until such time that lips pass completely through the apertures whereby the tabs assume their unflexed positions and the lips latchingly engage bottom housing 216 with top housing 208. Alternatively, it will be understood that the lipped tabs or similar structure may be carried by the top housing 208 and corresponding slots may be provided, where appropriate, in the circumferential wall or the end wall of the second bottom housing 216 in order to achieve the desired latching engagement between the first and bottom housings of the trimmer head housing. Eyelet covers 1710 cover eyelets 204 (FIG. 2), and together with eyelet supports 502 (FIG. 5) secure eyelets 204 in place.

FIG. 18 shows a perspective view of top housing 208. Top housing 208 includes eyelets 204, extension 220, openings 1708, eyelet covers 1710, collar 1802, bottom 1804, wall 1806, and opening 1808. In other embodiments, top housing 208 may not have all of the elements listed and/or may have other elements instead of, or in addition to, those listed.

Eyelets 204 and extension 220 were discussed in conjunction with FIG. 2. Extension 220 is drawn with dashed lines to indicate that most of extension 220 is hidden from view by an outer collar that is concentric with extension 220. Openings 1708 and eyelet covers 1710 were discussed in conjunction with FIG. 17. Collar 1802 receives shaft 106 and protects the region where shaft 106 meets top housing 208. Bottom 1804 is the bottom of extension 220, which is attached to fastener 206. In an embodiment, fastener 206 is a threaded bolt, and bottom 1804 may be a threaded hole into which fastener 206 is screwed. Wall 1806 is a wall of top housing 208. Openings 1808 are openings under eyelet covers 1710 into which eyelet supports 502 (FIG. 5) are inserted.

Figure 19:
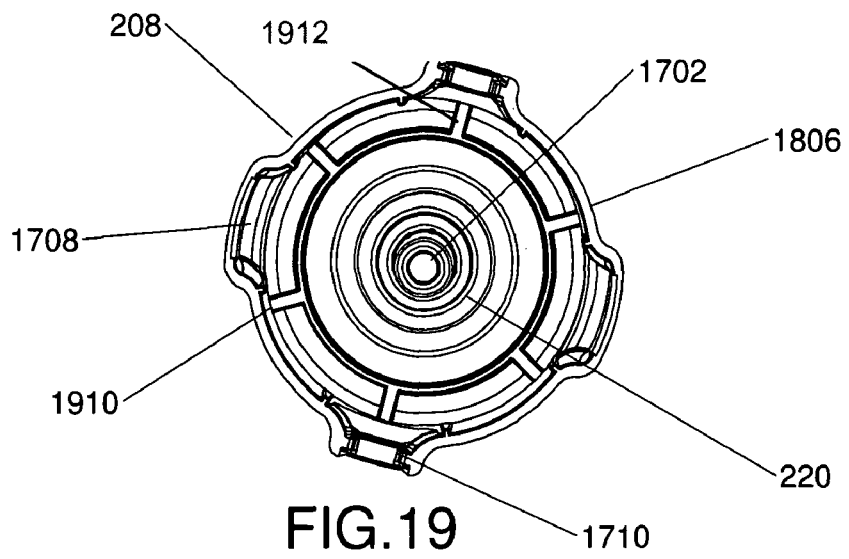
FIG. 19 shows a bottom view of the top portion of an embodiment of the housing.

FIG. 19 shows a top view of top housing 208. Top housing 208 includes extension 220, central opening 1702, openings 1708, eyelet covers 1710, depressions 1910, and ribs 1912. In other embodiments, top housing 208 may not have all of the elements listed and/or may have other elements instead of or in addition to those listed.

Eyelets 204 and extension 220 were discussed in conjunction with FIG. 2. Extension 220 is drawn with dashed lines to indicate that most of extension 220 is hidden from view by an outer collar that is concentric with extension 220. Central opening 1702, openings 1708 and eyelet covers 1710 were discussed in conjunction with FIG. 17. In FIG. 19, the circle representing central opening 1702 is not concentric with the other circles representing other features of top housing 208, because in FIG. 19 top housing 208 is oriented at a slight angle. Depression 1910 engages projections 230 stopping spool 210 from spinning. Depressions 1910 are formed by ribs 1912. Depression 1910 formed by ribs 1912 and the depression formed by ribs 508 create an indexing mechanism that facilitates releasing a controlled amount of trimmer line upon pressing on turning-knob 218 (to release trimmer line 110) while trimmer head 108 is in operation.

As depicted in FIGS. 17-19 top housing 208 includes a central opening 1702. Prior to assembly of trimmer head 108, the threaded arbor of a trimmer apparatus driveshaft at bottom 1804 is inserted through opening 1702 and a fastener (e.g., nut/bolt) 206 is threaded onto the driveshaft arbor which secures top housing 208 to the threaded driveshaft arbor.

That is, spool 210 is divided into two chambers or compartments by the provision of an intermediate flange 708 located between flanges 228 and 226. Intermediate flange 708 may be coplanar with noncircular collar 812 (FIG. 8), discussed below, and provided within the core of spool 210.

Further Discussion

The following discussion further elaborates on how the various components of vegetation trimmer 100 interact and function repeating some information already discussed above for clarity. In an embodiment, illustrated in FIGS. 7, 8, 15, and 16, for example, projections 224 and 230 are adapted to cooperate with seats in the form of sloped (e.g., arcuate) and/or vertical depressions 508 (FIG. 5) and 1910 (FIG. 19) provided on the inner face of both first and second housing bottom housing 216 and 208. Projection 224 or 230 are received in depressions 508 (FIGS. 5 and 6) and depressions 1910 (FIG. 19). It will be understood that the relative positions of the projections 224 and 230 and depressions 508 and 1910 may be reversed. That is, suitable sloped projections may be provided in the inner faces of the top housing 208 and bottom housing 216 and cooperating depressions may be formed in the outer faces of both of flanges 226 and 228. Projections 224 and 230 are normally retained in depressions 508 and 1910 under the influence of the compression force of mechanical bias 212.

Accordingly, the sloped surfaces (e.g., cam surfaces) of projections 224 and 230 on flanges 226 and 228, respectively, are inclined in such a way that spool 210 is capable of practical rotation in one direction (e.g., counterclockwise) when flange 228 faces upwardly and rotates in the opposite direction (e.g., clockwise) when second flange 226 faces upwardly (FIG. 11A).

With this capability, spool 210 of trimmer head 108 may be used, regardless of whether the trimmer's driveshaft rotates clockwise or counterclockwise.

Referring to FIGS. 7, 8, 13, 15, and 16, extending inwardly from the outer surfaces of flanges 226 and 228 and terminating at noncircular collar 812 is a pair of opposed sockets 712. In the illustrated embodiment, sockets 712 have a non-circular shape.

Referring to FIGS. 2-4, 9A, and 9B, turning-knob 218 or 518 is suitable for enabling a user to wind trimmer line onto spool 210. Turning-knob 218 or 518 (FIG. 2 or 5, respectively) includes grip 406 (FIG. 4), which is adapted to project through a central aperture 604 (FIGS. 4-6) provided in bottom housing 216. Grip 406 may be provided with a plurality of raised grip enhancing formations about its periphery. Turning-knob 218 or 518 may also include noncircular collar 812 (FIG. 8), which is separated from grip 406 by a radially outwardly directed flange 902. Flange 902 may be adapted to rest against the inner face of the closed end of the bottom housing 216. The inner face of the closed end of the second bottom housing 216 surrounding central aperture 604 is provided with a circular seat 606 (FIG. 6), which is dimensioned to closely receive flange 902 (FIGS. 9A and 9B) in the manner shown in FIGS. 4-6. Noncircular collar 812 is sized and shaped to mate or to matingly cooperate with sockets 712 of trimmer line spool 210. In the illustrated embodiment, therefore, noncircular collar 812 of turning-knob 218 or 518 is generally a non-circular symmetric shape to permit its insertion into either of sockets 712 in spool 210. It will be appreciated, however, that the mating of sockets 712 and noncircular collar 812 are not limited to any particular shape. Indeed, they may assume any mating shape other than a purely circular configuration that will cause the rotation of spool 210 as a result of the rotation of the knob portion of turning-knob 218 or 518.

It should be noted that spool cover 302 (FIGS. 3, 10, and 11) may be placed in spool socket 702 of spool 210 by an assembly person/worker at a plastic injection mold factory, for example. The combination of spool cover 302 and spool 210 may be sold preassembled.

Spool cover 302 has insert posts 1102 that are to be joined with receiver openings opening 1510 within the spool socket that has an open face, U shaped "non-linear" portion of a trimmer line guide channel exposed. Spool cover 302 may be a friction fit assembly and in an embodiment, once connected, spool cover 302 can not easily be removed. Additionally, when the trimmer head 108 is fully assembled spool cover 302 is held in place by either being biased by mechanical bias 212 (e.g., a spring) and/or by being biased by turning-knob 218 or 518 (turning-knob 218 or 518 is also biased by mechanical bias 212).

Eyelets 204, (FIGS. 2, 4, and 18) may be fixed and preassembled to main housing body 208 by an assembly person/worker and may be metal (or another material, such as plastic). Eyelets 204 slide into a side wall of main housing body 208 with a friction fit (in an embodiment, the sidewalls are tapered). Eyelets 204 can be installed by hand without the use of tools and removed and replaced by hand as well.

Assembly of trimmer head 108 is as follows. A user first inserts grip 406 (FIG. 4) portion of turning-knob 218 or 518 until knob flange 902 comes to rest against the inner face of the closed end of bottom housing 216. He or she then places spool 210 into the bottom housing 216, while bringing one of sockets 712 into mating engagement with turning-knob 218 or 518.

When inserting spool 210, the user may either orient spool 210 so that flange 228 is upward or flange 226 is upward depending on whether vegetation trimmer 100 has a driveshaft arbor that turns clockwise or counterclockwise. In an embodiment, the direction of winding is dictated by the direction of rotation of driveshaft 202. If the driveshaft 202 rotates counterclockwise, then the direction for winding trimmer line 110 onto spool 210 is clockwise, and if the driveshaft 202 rotates clockwise, then the direction for winding trimmer line 110 onto spool 210 is counterclockwise. Legends 702 (FIGS. 7, 8, 13, 15, and 16) are molded on flanges 228, 226 to help the user avoid misplacing of spool with respect to bottom housing 216 and turning-knob 218 or 518. Legends 702 may include an instructional message and directional symbols.

Mechanical bias 212 is then placed into the open upwardly facing one of sockets 712, and top housing 208 may be brought into closing engagement with bottom housing 216.

In an embodiment, each of the sockets 712 may provide for placement of a small removable (e.g. friction fit) semi-permanent insert, stop 332 (FIGS. 2, 3, 13, and 14) can be placed in openings 706 and openings 1508 provided in sockets 712, which binders or blocks the misplacement of the spool 210 in the trimmer head housing 216, incorrectly. If an end user does not use or looses stop 332 and error in properly placing the spool within the trimmer housing, top housing 208 and bottom housing 216 may be separated to permit spool 210 to be inverted into proper position. Alternatively, instead of using stop 332, turning-knob 518 may be attached to spool 210. Once turning-knob 518 is attached to spool 210, the user is unlikely to attempt to install spool 210 in the wrong orientation, because then turning-knob 518 would be facing upwards.

Referring to FIGS. 11 and 15, it will be seen that spool 210 when joined with spool cover 302 includes a continuous closed "non-linear" trimmer line guide passageway, formed from channels 1104 and/or 1506, which may be formed coplanar with intermediate spool flange 708. In the specification, the trimmer line guide means is a continuous closed "non-linear" passageway passing from a first of channels 214 of intermediate spool flange 708 through plate 814 (FIG. 8) and/or spool cover 302 (FIG. 3) and through a second of channels 214 (at the opposite side of spool 210).

As seen in FIGS. 11 and 15 the channel formed by channels 1104 and/or 1506 communicates with oppositely oriented openings in channels 214, which are a first and second enlarged portions of intermediate flange 708. Channels 214 are constructed and arranged to ensure that trimmer line 110 is properly wound on both upper and lower chambers of spool 210 equally during reloading of trimmer line onto the spool 210. For example, an opening along the length of one of channels 214 faces upward and an opening along the length of another of channels 214 faces upwards, so that one half of trimmer line 110 is wound around an upper half of the core of spool 210, and an opening along the length of another of channels 214 faces downwards, so that the other half of trimmer line 110 is wound around a lower half of the core of spool 210. Also, it may be beneficial for the opposite open ends of the passageway of channel 214 to be funnel or flare shaped, as at 214 (FIGS. 6, 7, 11) to facilitate insertion of trimmer line into the passageway of channel 214. In order to load trimmer line 110 into trimmer head 108, channel 214 is first brought into alignment with trimmer line exit ports (e.g., eyelets 204. Trimmer line 110 may be long enough to load spool 210 with enough trimmer line so that trimmer line may be released at least once after the initial length of trimmer line wears out, and trimmer line 110 may be short enough so that the trimmer line fits on spool 210. One of ends 112a and 112b is inserted into either eyelet 204 and by feeding and/or pushing the trimmer line 110 through channel 214 (which is a trimmer line guide means) of spool 210 until trimmer line 110 passes out of the opposite exit of eyelet 204.

Trimmer line 110 (FIG. 1) should then be adjusted so that approximately equal lengths of line project from each exit port. The user then winds turning-knob 218 or 518 (FIG. 2 or 5, respectively) of the trimmer turning-knob 218 or 518 in the direction that is free to turn spool 210 (FIG. 2), and trimmer line 110 is drawn into the housing and wound upon the upper and lower chambers of spool 210. The sloped surfaces of projections 224 and 230 allow a person to be able to easily turn turning-knob 218 or 518 (FIG. 2 or 5, respectively), which ratchets in one direction and cannot easily move in the opposite direction. As turning-knob 218 or 518 is turned, projections 224 and/or 230 (FIG. 2) make contact with indexing ribs 508 (FIG. 5) in bottom housing 216 (FIG. 2) that glide upward and over the rib and then drop into the depressions 508 which locks the spool from turning in the opposite direction. The substantially vertical stop faces of projections 224 and 230 prevent uncontrolled discharge of trimmer line during vegetation trimming.

Trimmer head 108 is a bump indexing variety of trimmer head. That is, trimmer head 108 permits user-controlled discharge of trimmer line 110 utilizing the centrifugal force generated by the rapid rotation of trimmer head 108. More particularly, when the bottom of turning-knob 218 or 518 is tapped against a hard surface, the biasing force of mechanical bias 212 is momentarily overcome. Consequently, the substantially vertical stop faces of projections 224 and 230 are momentarily displaced from contact with the corresponding substantially vertical stop faces of depressions 508. During this brief instant, centrifugal force causes trimmer line 110 to be discharged through eyelets 204. Thereafter, mechanical bias 212 re-seats the spool into engaging contact between the stop faces of projections 224 or 230 and their counterparts in depressions 508. It is also possible to unload trimmer line 110 from trimmer head 108 in a fully manual mode. As such, when the user desires to extract trimmer line 110 from the head, he or she brings trimmer head 108 to a complete stop, pushes the bottom of knob 402 inwardly against the biasing force of 212, while turning turning-knob 218 or 518 and pulling on the trimmer line 110 to extract the desired length of line from spool 210. When sufficient trimmer line has been discharged, the user releases the knob and resumes trimming.

Method of Assembly

Figure 20:
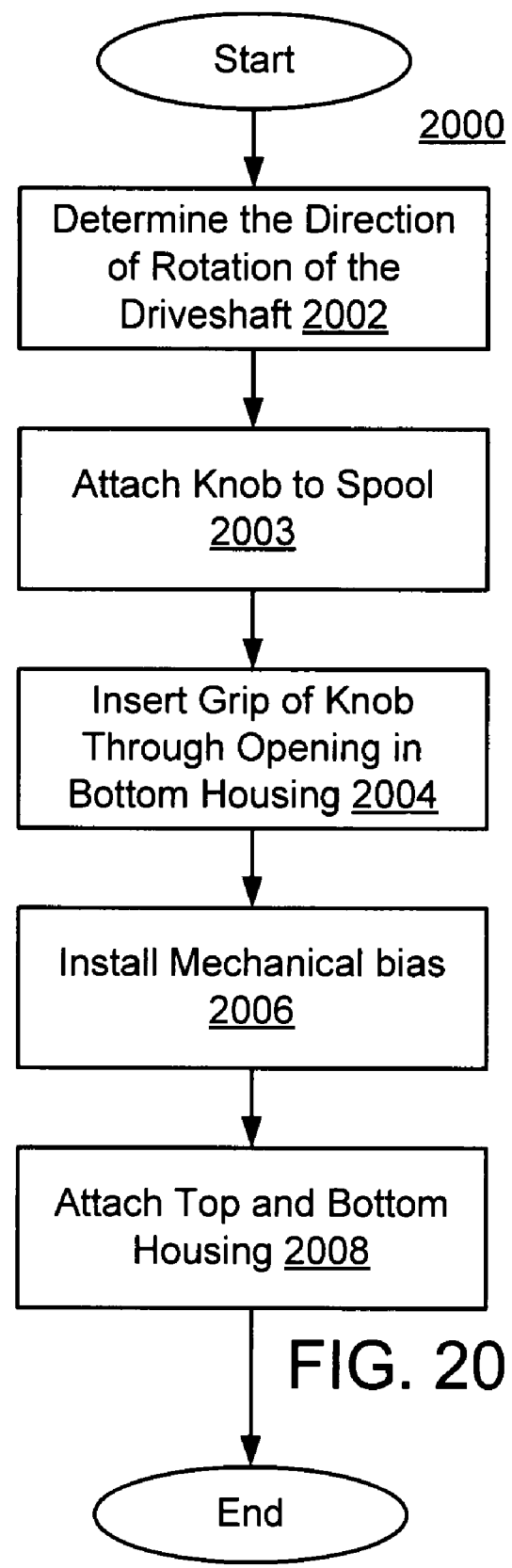
FIG. 20 shows a flowchart of an embodiment of a method of assembling the trimmer head of FIG. 1.

FIG. 20 shows a flowchart of an embodiment of a method 2000 of assembling trimmer head 108 (FIG. 1). In step 2002, a determination is made whether flange 228 or flange 226 is inserted facing upward depending on whether vegetation trimmer 100 has a driveshaft arbor that turns clockwise or counterclockwise (FIG. 2). In an embodiment, the direction of winding is dictated by the direction of rotation of driveshaft 202. If the driveshaft 202 rotates counterclockwise, then the direction for winding trimmer line 110 onto spool 210 is clockwise, and if the driveshaft 202 rotates clockwise, then the direction for winding trimmer line 110 onto spool 210 is counterclockwise. The one assembling trimmer head 108 may refer to legends 702 (FIGS. 7, 8, 13, 15, and 16), which are molded on flanges 226 and 228 to aide user from misplacement of spool with bottom housing 216 and 218. Legends 702 may include instructional message and directional symbols, which aid in determining the orientation of spool 210 during step 2002.

In step 2003, attach turning-knob 218 or 518 to a side of the spool determined by the direction of rotation that the motor rotates the driveshaft.

In step 2004, a user inserts grip 406 (FIG. 4) of turning-knob 218 or 518 into bottom housing 216 (FIG. 2), until knob flange 902 (FIG. 9A) comes to rest against the inner face of the closed end of bottom housing 216. He or she then places spool 210 into the bottom housing 216, while bringing one of sockets 712 (FIG. 7) into mating engagement with turning-knob 218 or 518 (FIG. 2 or 5, respectively).

In step 2006, mechanical bias 212 is then placed into the open upwardly facing socket 712, and in step 2008 top housing 208 may be brought into closing engagement with bottom housing 216 (FIG. 2). By joining spool 210 (FIG. 2) with spool cover 302 (FIG. 3) a "non-linear" trimmer line guide passageway is formed from channels 1104 (FIG. 11A) and/or 1506 (FIG. 15), coplanar with intermediate spool flange 708 (FIG. 7). In an embodiment, as a result of step 2008, a continuous closed "non-linear" passageway passes from a first enlarged portion, a first of channels 214, of intermediate spool flange 708 through spool cover 302 and/or plate 814 (FIGS. 7 and 8) and through a second enlarged portion (at the opposite side of spool 210), the second of channels 214, of intermediate flange 708, which forms a trimmer line guide.

Method of Loading Trimmer Line

Figure 21:
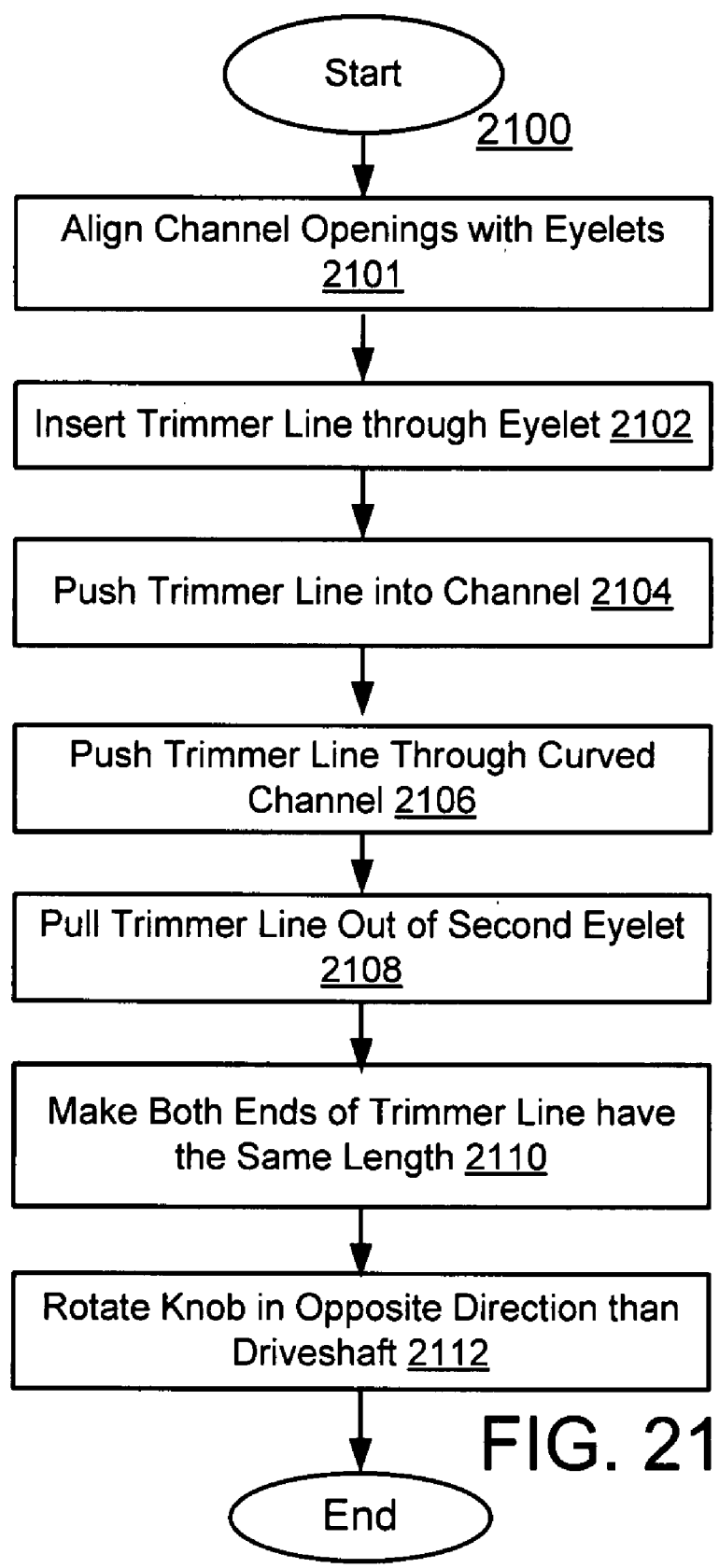
FIG. 21 shows a flowchart of an embodiment of a method for loading trimmer line into the trimmer head of FIG. 1.

FIG. 21 shows a flowchart of an embodiment of a method 2100 for loading trimmer line 110 into trimmer head 100. In step 2101, in order to load trimmer line 110 (FIG. 1) into trimmer head 108, channel 214 is first brought into alignment with trimmer line exit ports (eyelets 204) by turning turning-knob 218 or 518 (FIG. 2 or 5, respectively). In step 2102, one of ends 112a or 112b (FIG. 1) is inserted into one of eyelets 204. As part of step 2102, one fixed length of trimmer line 110 may be used that is long enough to load the inner spool 210 with enough trimmer line so that trimmer line 110 may be released at least once after the initial length of trimmer line wears out and short enough so that the trimmer line fits on spool 210. One of ends 112a and 112b is inserted into either eyelet 204 and trimmer line 110 is fed and/or pushed through channel 214 (which is a trimmer line guide means) of spool 210 until trimmer line 110 passes out of the opposite exit eyelet 204.

In step 2104, trimmer line 110 (FIG. 1) is pushed through channel 214 (FIG. 2). In step 2106, trimmer line 110 is pushed through the channel in the core of spool 210 (the channel formed by channels 1104 (FIG. 11A) and channel 1506 (FIG. 15)) around extension 220 (which is located in a central area of the core of spool 210). In step 2108, trimmer line 110 is pushed through channels 1104 and 1506 on the other side on trimmer head 108. In step 2108, trimmer line 110 is pushed out of the second eyelet 204. In step 2110, trimmer line 110 is pulled further through trimmer head 108 until the ends of the trimmer line sticking out of both eyelets 204 are about equal in length.

In step 2112, turning-knob 218 or 518 (FIG. 2 or 5, respectively) is rotated in the opposite direction as motor 102 (FIG. 1) rotates spool 210, which includes sliding projections 224 and 230 (FIG. 2) over the ribs 508 and/or 1912 (FIGS. 5 and 19). As part of step 2112, trimmer line 110 should then be adjusted so that approximately equal lengths of line project from each exit port. In step 2112, the user then winds turning-knob 218 or 518 of the trimmer head 108 (FIG. 1) in the direction that is free to turn, which turns spool 210 and trimmer line 110 is drawn into the housing and wound upon the upper and lower chambers of spool 210. During step 2112, the sloped surfaces of projections 224 and 230 allows a person to be able to easily turn turning-knob 218 or 518, which ratchets in one direction and cannot easily move in the opposite direction. As turning-knob 218 or 518 is turned projections 224 and 230 makes contact with ribs 508 and/or 1910 (for indexing) in bottom housing 216 (FIG. 2) that glide upward and over the ribs 1910 and then drop into the depressions 608

(FIG. 6), which locks spool 210 from turning in the opposite direction. In step 2112, the substantially vertical stop faces of projections 224 and 230 prevent uncontrolled discharge of trimmer line 110 during vegetation trimming.

Method of Releasing Trimmer Line

Figure 22:
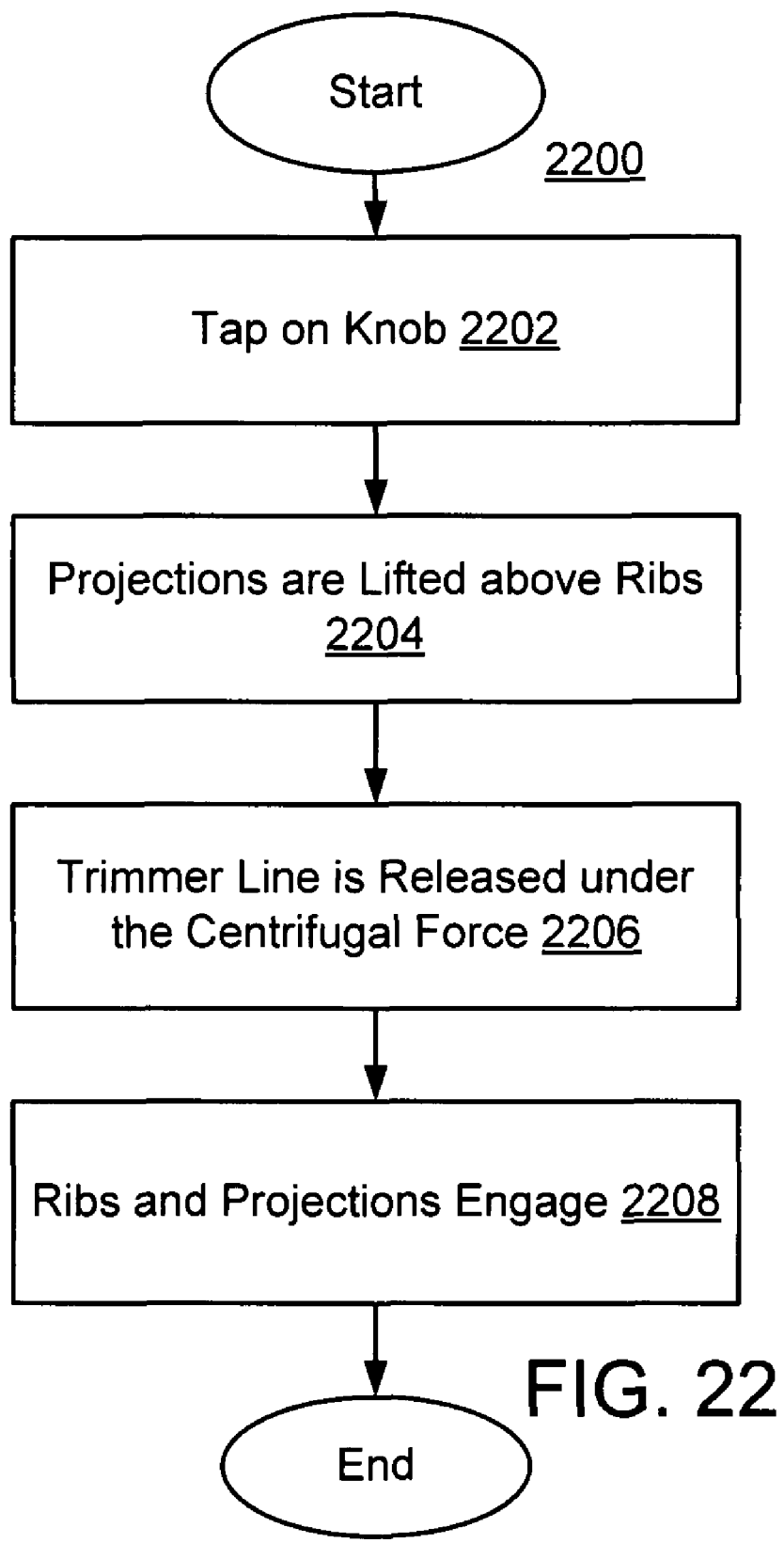
FIG. 22 shows a flowchart of an embodiment of a method for releasing trimmer line from the trimmer head of FIG. 1.

FIG. 22 shows a flowchart of an embodiment of a method 2200 for releasing trimmer line 110 from trimmer head 108 (FIG. 1). In step 2202, while in operation, turning-knob 218 or 518 (FIG. 2 or 5, respectively) is tapped on something, such as the ground. In step 2204, as a result of the tap of step 2202, projections 402 (FIG. 4) are lifted above ribs 508 and/or 1910 (FIGS. 5 and 19) causing spool 210 to rotate at a different rate than top housing 208 and bottom housing 216 (FIG. 2). In step 2206, the centrifugal force causes trimmer line 110 to unwind off of spool 210 (FIG. 2). In step 2208, stop 714 (FIG. 7) of one of projections 224 and 230 (FIG. 2) hits one of ribs 508 and/or 1910 or a face of a depression causing spool 210 to rotate with top housing 208 and stopping trimmer line 110 from unwinding further.

Alternative Embodiments

In an alternative embodiment, spool 210 is attached directly to shaft 106, and the mechanical bias 212 pushes the housing away from shaft 106. In an alternative embodiment, top housing 208 has shorter side walls and instead, housing bottom 216 has taller side walls. Any place where there are two or more embodiments of the same component, such as turning-knob 218 and turning-knob 518, where one of the embodiments or a component of one of the embodiments is mentioned (e.g., turning-knob 218 or 518) any of the other embodiments or the corresponding components of those embodiments (if there is a corresponding component) may be substituted (e.g., turning-knob 518) to arrive at another embodiment. Although in the above embodiments, channel 1506 is parallel with flanges 226, 228, and 708, in other embodiments, channel may be angled with respect to flanges 226, 228, and 708. In this embodiment, each of eyelets 204 would be at a different level and channels 214 would be unnecessary.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method comprising:
    providing a spool having a central opening for receiving a driveshaft, a curved channel that extends around said central opening without passing into said central opening, and two open ends on opposite sides of said spool that lead into said curved channel;
    providing a housing that receives said spool therein, wherein eyelets are formed in said housing;
    aligning said eyelets with said open ends leading to said curved channel within said spool;
    providing a length of trimmer line;
    inserting said trimmer line trimmer line into a first of said eyelets;
    advancing said trimmer line through the curved channel, and around said central opening, wherein said curved channel automatically guides said trimmer line through a second of said eyelets and out of said housing; and
    rotating said spool relative said housing to wind said trimmer line onto said spool.

2. The method according to claim 1, wherein said step of rotating said spool includes providing a knob, attaching said knob to said spool and manually rotating said knob.

3. The method according to claim 1, wherein said step of providing a spool includes providing a spool having a first flange, a second flange and an intermediate flange between said first flange and said second flange, wherein said curved channel is disposed within said intermediate flange.

4. The method according to claim 1, wherein said step of manually rotating said spool includes providing a knob that is affixed to said spool and extends out of said housing, wherein said knob is manually grasped and turned to rotate said spool within said housing.

5. A method of loading trimmer line onto a trimmer head comprising:
    providing a spool having a core, a top flange radially extending from said core, a bottom flange radially extending from said core and a intermediate flange radially extending from said core, wherein said core is tubular and defines a central opening;
    providing a channel that passes around said central opening and extends from a first open end, through at least part of said intermediate flange, and around part of said central opening, to a second open end;
    providing a housing having a first eyelet and a second eyelet formed therein, wherein said housing receives said spool;
    manually rotating said spool within said housing to align said first open end of said channel with said first eyelet of said housing and to align said second open end of said channel with said second eyelet of said housing;
    advancing trimmer line into said first eyelet of said housing, wherein said trimmer line enters said channel and is automatically guided to, and out of, said second eyelet of said housing; and
    manually rotating said spool relative said housing to wind said trimmer line onto said spool.

6. The method according to claim 5, wherein said step of advancing trimmer line includes advancing trimmer line until a midpoint of said trimmer line is positioned within said housing.

7. The method according to claim 6, wherein said step of manually rotating said spool winds half of said trimmer line on said spool between said top flange and said intermediate flange and half of said trimmer line between said bottom flange and said intermediate flange.

8. A method of loading trimmer line onto a trimmer head comprising:
    providing a spool having a tubular core that defines a central opening;
    providing a channel that extends from a first open end to a second open end around part of said central opening;
    providing a housing having a first eyelet and a second eyelet formed therein, wherein said housing receives said spool;
    manually rotating said spool within said housing to align said first open end of said channel with said first eyelet of said housing and to align said second open end of said channel with said second eyelet of said housing;
    advancing trimmer line into said first eyelet of said housing, wherein said trimmer line enters said channel and is automatically guided to, and out of, said second eyelet of said housing; and manually rotating said spool relative said housing to wind said trimmer line onto said spool.

9. The method according to claim 8, wherein said step of providing a spool includes providing a spool with a top flange, a bottom flange, and an intermediate flange.

10. The method according to claim 9, wherein said step of manually rotating said spool includes providing a knob that is affixed to said spool and extends out of said housing, wherein said knob is manually grasped and turned to rotate said spool within said housing.

11. The method according to claim 10, wherein said step of advancing trimmer line includes advancing trimmer line until a midpoint of said trimmer line is positioned within said housing.

12. The method according to claim 11, wherein said step of manually rotating said spool winds half of said trimmer line on said spool between said top flange and said intermediate flange and half of said trimmer line between said bottom flange and said intermediate flange.

* * * * *